(12) United States Patent
Bouchard et al.

(10) Patent No.: US 8,839,322 B2
(45) Date of Patent: Sep. 16, 2014

(54) METHOD AND SYSTEM FOR TRIGGER MANAGEMENT IN AN INTERACTIVE TELEVISION ENVIRONMENT

(75) Inventors: Jean Bouchard, Québec (CA); David Merritt, Ottawa (CA); Roger Ruiz-Carrillo, Montreal (CA)

(73) Assignee: BCE Inc., Verdun, Quebec (CA)

( * ) Notice: Subject to any disclaimer, the term of this patent is extended or adjusted under 35 U.S.C. 154(b) by 137 days.

(21) Appl. No.: 13/339,040

(22) Filed: Dec. 28, 2011

(65) Prior Publication Data

US 2012/0174171 A1    Jul. 5, 2012

Related U.S. Application Data

(60) Provisional application No. 61/427,954, filed on Dec. 29, 2010.

(51) Int. Cl.
| | | |
|---|---|---|
| H04N 7/173 | (2011.01) | |
| H04N 7/16 | (2011.01) | |
| H04N 21/6543 | (2011.01) | |
| H04N 21/81 | (2011.01) | |
| H04N 21/258 | (2011.01) | |
| H04N 21/262 | (2011.01) | |

(52) U.S. Cl.
CPC ....... *H04N 21/6543* (2013.01); *H04N 21/8166* (2013.01); *H04N 21/25858* (2013.01); *H04N 21/26291* (2013.01)
USPC .............. 725/100; 725/91; 725/114; 725/144

(58) Field of Classification Search
USPC ................... 725/91, 100, 114, 144
See application file for complete search history.

(56) References Cited

U.S. PATENT DOCUMENTS

| | | | |
|---|---|---|---|
| 2003/0208563 A1* | 11/2003 | Acree et al. ............... | 709/219 |
| 2003/0227567 A1* | 12/2003 | Plotnick et al. ............ | 348/552 |
| 2008/0151866 A1* | 6/2008 | Wu ........................... | 370/352 |
| 2008/0310408 A1* | 12/2008 | Thompson et al. ......... | 370/386 |
| 2009/0235299 A1 | 9/2009 | Astrom et al. | |
| 2011/0035780 A1 | 2/2011 | Cedervall et al. | |
| 2012/0023194 A1* | 1/2012 | Ruiz-Velasco et al. ..... | 709/217 |

* cited by examiner

*Primary Examiner* — Gigi L Dubasky

(57) ABSTRACT

A trigger manager and related processes and systems for managing triggers for a plurality of subscribing set-top boxes in an interactive television environment are provided. In response to receipt of a configuration update request originating from a specific set-top box, the trigger manager accesses a database of subscribing set-top box profiles associating subscribing set-top boxes with respective sets of triggers. The database is processed based on the configuration update request to identify a profile associated with the specific set-top box from which the configuration update request originated. Trigger update information associated with the identified profile is transmitted over a network to the specific set-top box from which the configuration update request originated. In response to receipt at the specific set-top box of the trigger update information, the set of current triggers in the memory unit is updated at least in part based on the information received.

26 Claims, 12 Drawing Sheets

METHOD AND SYSTEM FOR TRIGGER MANAGEMENT IN AN INTERACTIVE TELEVISION ENVIRONMENT

CROSS-REFERENCE TO RELATED APPLICATIONS

The present application claims the benefit of priority under 35 USC §119e) based on U.S. provisional patent application Ser. No. 61/427,954 filed on Dec. 29, 2010 by Jean BOUCHARD et al.

The contents of the above-referenced document are incorporated herein by reference.

FIELD OF THE INVENTION

The present invention relates to interactive television environments such as Internet Protocol Television (IPTV) environments, and in particular to methods, systems and devices for managing application triggers (or simply "triggers") in connection with set-top boxes used in connection with such interactive television environments.

BACKGROUND

IPTV (Internet Protocol Television) is an emerging system where digital television and multimedia services are delivered to set-top boxes present in a home environment using IP over a network infrastructure. Already today, IPTV enables a more customized and interactive user experience amongst other by providing viewers with greater control over their television viewing. Today, IPTV is most often associated with Video on Demand (VoD) and live TV services. However, IPTV can also provide Internet services, such as web access and Voice over IP (VoIP). Another feature of IPTV is the opportunity for integration and convergence with other multimedia services for example chats and different messaging services allowing IPTV users to communicate with each other.

The enhanced functionality and customized/interactive user experience are provided by IPTV-related applications through set-top boxes. Some examples of IPTV-related applications are audio player, Electronic Program Guide (EPG) and Local Personal Recorder (IPVR) applications. Such IPTV-related applications may be pre-loaded on the set-top box, may be downloaded to the set-top box after installation or, alternatively may be stored on a remote server remote in communication with the set-top box over a network.

Generally, specific IPTV-related applications are invoked and events are instantiated at the set-top box when certain conditions are met. The certain condition to be met may take many different forms. For example, the certain condition for a specific IPTV-related application may be based on a button on a remote control being pressed, on a selection being made by the user in a menu displayed by the set-top box on the display (television) screen, on a date and/or time of day, on a channel selection made by the user and/or on information provided as part of the television content (or video stream). Generally, the set-top box will store information specifying the IPTV-related applications available at the set-top box in association with the condition to be met for launching each IPTV-related application.

In recent years, in light of the increase in interest in IPTV and the potential that it represents, different tools have been designed in order to facilitate the developments of customized IPTV-related applications. One such tool is the Microsoft Media Room™ infrastructure (available from Microsoft Corporation), which allows network operators and application providers to create additional interactions with the viewer. Although the purpose of such additional interactions is to enhance the viewer's experience, the increase in the number of interactions sometimes causes issues such as conflicting conditions for launching an applications and/or resource overload, and thus increasing the number of additional interactions can ultimately end up degrading the viewer's experience rather than enhancing such experience. Existing techniques fail to provide suitable solutions for addressing such issues.

In light of the above, there is a need to provide an improved technology-based solution for allowing additional viewer interactions to be introduced as part of an IPTV service offering that alleviates at least in part the deficiencies of the existing systems.

SUMMARY

In accordance with a first aspect, the invention provides a method for managing triggers for a plurality of subscribing set-top boxes in an interactive television environment. The method comprises, in response to receipt of a configuration update request originating from a specific set-top box in the plurality of subscribing set-top boxes, accessing a database of subscribing set-top box profiles, the database of profiles associating subscribing set-top boxes with respective sets of triggers. The method also comprises processing the database based on the configuration update request to identify a profile associated with the specific set-top box from which the configuration update request originated. The method further comprises transmitting over a network a specific set of triggers to the specific set-top box from which the configuration update request originated, the transmitted specific set of triggers being associated with the identified profile.

In accordance with specific examples of implementation, the triggers in the sets of triggers may be application-bound trigger and/or application-provisioned trigger.

In accordance with a specific example of implementation, the method comprises receiving a trigger registration request that specifies a new trigger to be added in connection with one or more specific subscribing set-top boxes corresponding to one or more profiles in the database of subscribing set-top box profiles. The new trigger specified by the trigger registration request may be associated with trigger attributes, including an event attribute, associated with an event to be instantiated at a set-top box, as well as a criteria attribute, conveying a condition under which the event is to be instantiated. The trigger registration request may be provided via an application program interface (API) module.

In accordance with the specific example of implementation, in response to receipt of a trigger registration request specifying the new trigger, the method comprises accessing the database of subscribing set-top box profiles to derive validity information associated with the new trigger.

Different approaches may be taken, either independently or in combination, in order to derive validity information associated with the new trigger. In accordance with a first specific example, deriving validity information associated with the new trigger includes determining if there is a conflict between the new trigger and at least one current trigger in the database. In accordance with a second specific example, deriving validity information associated with the new trigger includes determining whether a threshold number of triggers has been exceeded in connection with a specific subscribing set-top box with which the trigger registration request is associated. In accordance with a third specific example, deriving validity information associated with the new trigger includes determining whether the specific subscribing set-top box has sufficient resources to instantiate the event defined by the event attribute of the new trigger.

In accordance with the specific example of implementation, the method also includes selectively updating the database based on the trigger registration request in dependence on the derived validity information. In a non-limiting example, in a case where a conflict between the new trigger and at least one current trigger in the database has been detected, the database of subscribing set-top box profiles may be updated at least in part by resolving the detected conflict. Resolving the detected conflict may be done in a number of different ways. For example, resolving the detected conflict may include selecting one of the new trigger and the current trigger as a surviving trigger and selecting the other one of the new trigger and the current trigger as a non-surviving trigger. The database of subscribing set-top box profiles may then be updated at least in part by including the surviving trigger in the set of triggers in the profile associated with the at least one specific subscribing set-top box, and by omitting the non-surviving trigger from the set of triggers of the profile associated with the at least one specific subscribing set-top box.

In specific implementations, a received trigger registration request may be associated with:
- a single specific subscribing set-top box corresponding to a profile in the database of subscribing set-top box profiles; or
- a group of subscribing set-top boxes corresponding to a group of profiles in the database of subscribing set-top box profiles, wherein each profile in the group of profiles is associated with a respective set of triggers. The group of subscribing set-top boxes may include all the set-top box profiles in the database or a subset of the subscribing set-top box profiles in the database (at least one subscribing set-top box profile in the database is excluded from the subset of subscribing set-top box profiles).

In a first specific example, the received trigger registration request is associated with a single specific subscribing set-top box corresponding to a profile in the database of subscribing set-top box profiles. The profile corresponding to the single specific subscribing set-top box is associated with a specific set of triggers. In this first example, the database of subscribing set-top box profiles is accessed to derive the validity information, which includes deriving the validity information at least in part by processing the set of triggers in the profile corresponding to the single specific subscribing set-top box. The database of subscribing set-top box profiles is then updated at least in part by adding the trigger specified by the trigger registration request to the set of triggers in the profile corresponding to the single specific subscribing set-top box when the validity information conveys that the trigger specified by the trigger registration request is valid for the specific subscribing set-top box.

In a second specific example, the received trigger registration request is associated with a group of subscribing set-top boxes corresponding to a group of profiles in the database of subscribing set-top box profiles. Each profile in the group of profiles is associated with a respective set of triggers. In this second example, the database of subscribing set-top box profiles is accessed to derive the validity information, which includes deriving the validity information at least in part by processing the set of triggers corresponding to each profile in the group of profiles. In a non-limiting implementation, the validity information conveys, for each of the subscribing set-top box profiles in the group of profiles, if the trigger specified by the trigger registration request is valid. The database of subscribing set-top box profiles is then updated at least in part by adding the trigger specified by the trigger registration request to the set of triggers corresponding to specific subscribing set-top box profiles for which the derived validity information conveys that the trigger specified by the trigger registration request is valid.

Optionally, in accordance with a specific example of implementation, the method can also comprise receiving a trigger removal request specifying a trigger to be removed from one or more profiles in the database of subscribing set-top box profiles. In this specific example, the database of subscribing set-top box profiles may be updated by removing from the sets of triggers in the database the trigger specified by the trigger removal request.

In accordance with another aspect, the invention provides a system for use in an interactive television environment. The system comprises a computing device including a processor programmed for implementing a method of the type described above for managing triggers for a plurality of subscribing set-top boxes in an interactive television environment.

In accordance with yet another aspect, the invention provides a non-transitory computer readable storage medium storing computer-readable instructions which, when executed by a processor in a computing apparatus, implement a method of the type described above for managing triggers for a plurality of subscribing set-top boxes in an interactive television environment.

In accordance with another aspect, the invention provides a set-top box comprising a processor programmed for maintaining a set of current triggers in a memory unit of the set-top box. In response to receipt at the set-top box of an updated set of triggers originating from a remote Trigger Server, the processor is programmed for updating the set of current triggers in the memory unit at least in part based on the updated set of triggers received from the Trigger Server. The processor is further programmed for determining if a specific condition has been met at the set-top box, where the specific condition is associated with a specific trigger in the set of current triggers. The processor is yet further programmed for, in response to a determination that the specific condition has been met at the set-top box, causing an event associated with the specific trigger to be instantiated by the set-top box. The event associated with the specific trigger caused to be instantiated includes launching an IPTV-related application such as, for example, a video-on-demand application or a social networking application.

In accordance with a specific example of implementation, each trigger in the set of current triggers is associated with trigger attributes including an event attribute associated with an event to be instantiated at the set-top box, and a criteria attribute conveying a condition under which the event is to be instantiated.

In accordance with a specific example of implementation, the updated set of triggers is received from the remote Trigger Server in response to a configuration update request transmitted to the Trigger Server by the processor of the set-top box. More specifically, the processor of the set-top box may be programmed for transmitting multiple configuration update requests over time to the remote Trigger Server in order to receive over time multiple updated sets of triggers at the set-top box. The transmission of the multiple configuration update requests may be performed at fixed or at variable time periods according to a specific schedule.

In accordance with yet another aspect, the invention provides a method for managing triggers in connection with a set-top box in an interactive television environment. The method comprises maintaining a set of current triggers in a memory unit of the set-top box. The method also comprises, in response to receipt at the set-top box of an updated set of triggers originating from a remote Trigger Server, updating the set of current triggers in the memory unit at least in part based on the updated set of triggers received from the Trigger Server. The method further comprises determining if a specific condition has been met at the set-top box, where the specific condition is associated with a specific trigger in the set of current triggers. The method yet further comprises, in response to a determination that the specific condition has been met at the set-top box, causing an event associated with the specific trigger to be instantiated by the set-top box.

In accordance with a specific example of implementation of the method, each trigger in the set of current triggers is associated with trigger attributes including an event attribute associated with an event to be instantiated at the set-top box, as well as a criteria attribute conveying a condition under which the event is to be instantiated.

In accordance with the specific example of implementation of the method, the updated set of triggers is received from the remote Trigger Server in response to a configuration update request transmitted to the Trigger Server by the set-top box. More specifically, the method may comprise causing the set-top box to transmit multiple configuration update requests over time to the remote Trigger Server in order to receive over time multiple updated sets of triggers at the set-top box. The transmission of the multiple configuration update requests may be performed at fixed or at variable time periods according to a specific schedule.

In yet another aspect, the invention provides a non-transitory computer readable storage medium storing computer readable instructions which, when executed by a processor at a set-top box, configures the set-top box to implement a method of the type described above for managing triggers in connection with a set-top box in an interactive television environment.

In accordance with yet another aspect, the invention provides a set-top box comprising an interface suitable for establishing a communication link with a network including a remote Trigger Server. The set-top box also comprises a memory unit storing a set of current triggers for the set-top box. Each trigger is associated with trigger attributes including an event attribute associated with an event to be instantiated at the set-top box, as well as a criteria attribute conveying a condition under which the event is to be instantiated. The set-top box further comprises a processor in communication with the interface. The processor is programmed for, in response to receipt of an updated set of triggers from the remote Trigger Server, updating the set of current triggers at least in part based on the updated set of triggers received from the Trigger Server. The processor is also programmed for determining if a specific condition has been met, where the specific condition is associated with a specific trigger in the set of current triggers. The processor is further programmed for, in response to a determination that the specific condition has been met, causing a specific event associated in the set of current triggers with the specific trigger to be instantiated. The set-top box yet further comprises an interface suitable for establishing a communication link with a display device for releasing a signal to visually convey to a viewer at least some information resulting from the instantiation of the event associated with the specific trigger.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

A detailed description of examples of implementation of the present invention is provided herein below with reference to the following drawings, in which.

Figure 1:
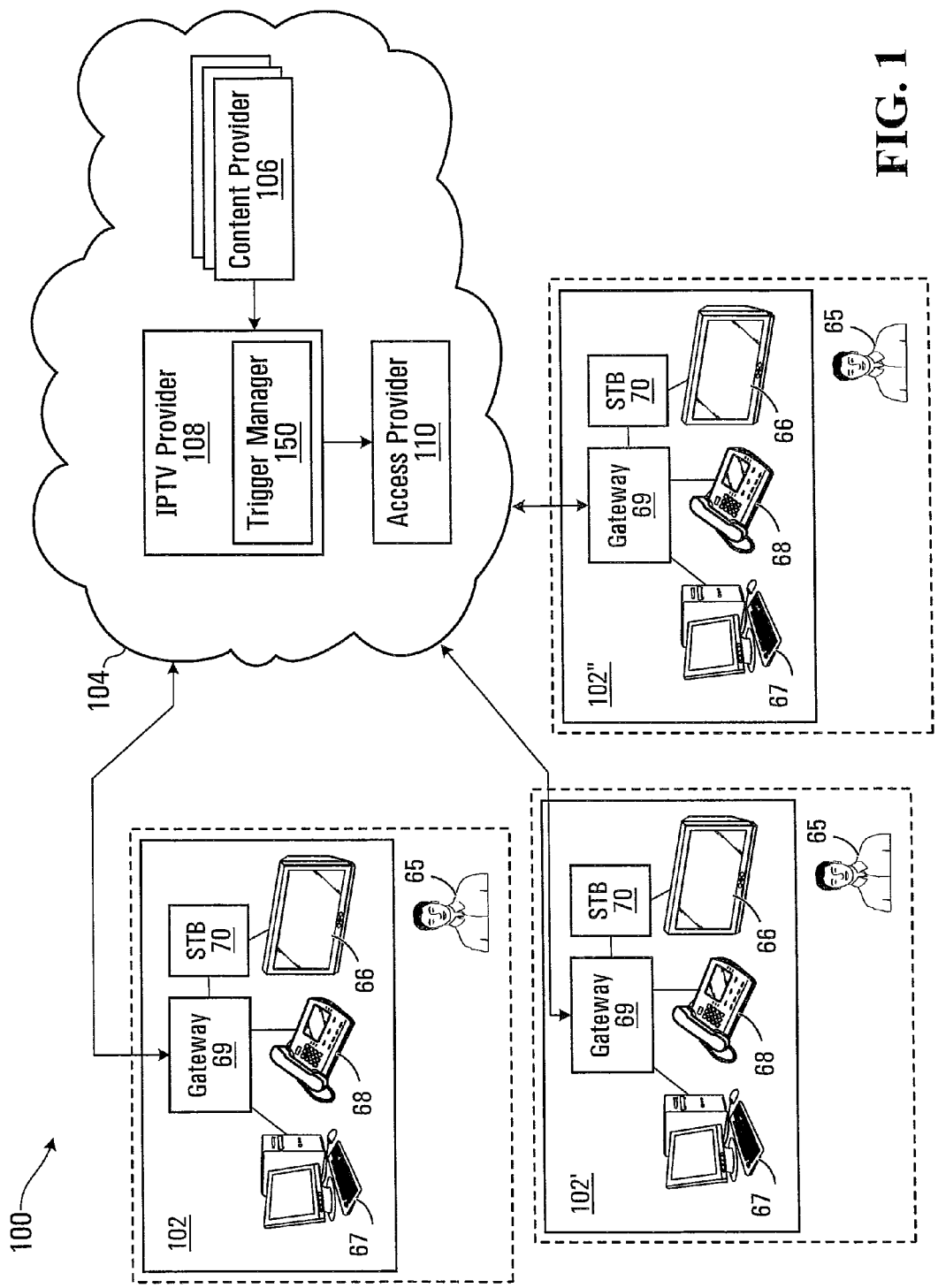
FIG. 1 shows an Internet Protocol Television (IPTV) environment in accordance with a non-limiting example of implementation of the invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 is a schematic overview of an Internet Protocol Television (IPTV) environment 100 in accordance with an example of implementation of the invention. For the purpose of simplicity, components of the IPTV environment 100 not required for the understanding of the invention and known in the art have been omitted from the figures and the description.

As depicted, the IPTV environment 100 comprises two types of interconnected networks, namely home networks 102, 102' and 102" and a global network 104. The global network 104 can be a managed or proprietary network operated by a network operator. Alternatively, the global network 104 may be a non-managed or open network, typically denoted Open Internet in the art. In either case, the global network 104 houses one or more content providers 106 having access to media content that is to be distributed to set top boxes (STBs) 70, 70' and 70" present in the home networks 102, 102' and 102". These content providers 106 can be network-arranged, dedicated content providers or indeed represent consumer generated media in the form of media available from other users in their respective home networks.

The media is generally available to the home networks 102, 102' and 102" through an IPTV provider 108 and access provider 110. The former represents the network-implemented entity that provides IPTV services to users, whereas the latter provides the actual transport and access to the provided services to the home networks 102, 102' and 102". It is also noted that although FIG. 1 shows a single access provider 110, the IPTV provider 108 may in fact be in communication with multiple access providers in dependence on the service the end users have subscribed to for providing access to the global network 104. The global network 104 illustrated in FIG. 1 should merely be seen as an illustrative example of a global network portion of an IPTV environment. Other network configurations comprising more or fewer network entities than the ones illustrated in FIG. 1 can alternatively be used without any impact on the teachings of the embodiments. For instance, in some networks a single operator can take the role of all or some of content provider 106, IPTV provider 108 and access provider 110.

In this specific example, the global network 104 is a packet-switched network and the IPTV service delivered over the global network 104 by the IPTV provider 108 employs Internet Protocol (IP) routing to convey audio, video and control data. Some of the IPTV services may include delivery of television (TV) content comprising TV programs (e.g., live or recorded drama, comedy, news, reality or other TV shows, movies, sporting events, etc.) currently broadcast on various TV channels. The IPTV services may also provide time-shifted TV programming allowing the subscribers to watch TV programs in a time-shifted manner (e.g., a "catch-up" TV feature which replays a TV program broadcast hours or days ago, or a "start-over" TV feature which replays a current TV program from its beginning). In addition to delivery of currently-broadcast TV content, in this case, the IPTV service also includes delivery of other audio/video (A/V) content on-demand, such as movies, TV shows, etc., which are not part of scheduled TV programming but can be selected by the subscribers using a video-on-demand (VOD) feature.

The home network 102 located at a subscriber premise is configured to receive and transmit packets pertaining to the IPTV service to allow a user 65 to be presented with TV content and/or other A/V content on a TV set 66. The TV set 66 may be based on any suitable display technology, including cathode ray tube (CRT), a liquid-crystal display (LCD), plasma, or any other type of TV display technology (e.g., Digital Light Processing (DLP) or organic light emitting diode (OLED)). In this embodiment, the home network 102 can also receive and transmit packets pertaining to an Internet access service to allow the user 65 to browse the Internet on a personal computer 67 (e.g., a desktop computer, a laptop computer, etc.), as well as packets pertaining to a voice-over-IP (VoIP) telephony service to allow the user 65 to engage in telephone calls using a telephone 68 (e.g., a VoIP phone, a Plain Old Telephony System (POTS) phone equipped with an analog terminal adapter (ATA), or a softphone).

More particularly, in this embodiment, the home network 102 comprises a gateway 69 connected to a set-top box (STB) 70 which is connected to the TV set 66. The STB 70 operates a media application, namely an IPTV application. In contrast to traditional decoders and set top boxes in digital TV systems, in an IPTV system, the set top box (STB) 70 provides two-way communications on an IP network, including a two-way communication with IPTV provider 108, and allows for decoding streamed media. The STB 70 also operates a trigger client application for managing various triggers in connection with STB 70 in accordance with an embodiment of the present invention, which will be described later on in the present document. As shown, the gateway 69 is also connected to the personal computer 67 and the telephone 68. In this embodiment, the gateway 69 acts as a center or hub for end-user devices in the home network 102. More particularly, in this embodiment the gateway 69 is a residential gateway (RG) whose functional entities are integrated into a terminal installed at a suitable location in a residence.

Home networks 102' and 102" are similar to home network 102 and include respective STBs 70' and 70" analogous to STB 70 and respective TV sets 66' and 66" analogous to TV set 66 and may also include other devices similar to personal computer 67 and the telephone 68 for example. Each one of STBs 70' and 70" also operates a media application, namely an IPTV application and a trigger client application for managing various triggers at the STB. It is to be appreciated that although IPTV environment 100 has been shown with three (3) STBs 70, 70' and 70", practical implementation of an IPTV environment may include any number of STBs. For the purpose of conciseness, the present document will describe STB 70 however it is noted that the description and examples that will be provided with reference to STB 70 can equally be applied to STB 70' and STB 70" as well as to any other additional STBs in the IPTV environment 100.

STB 70 is configured for running various IPTV-related applications providing IPTV services to the user 65. The IPTV-related applications may be in the form of embedded applications. Embedded applications refer to applications that are locally installed and executed by a processor at the STB 70. The STB 70 can be pre-equipped with such installed embedded applications or the applications can be downloaded to the STB 70 after installation in the home network 102. Examples of such embedded IPTV-related applications include chat applications, Electronic Program Guide (EPG) and Local Personal Video Recorder (IPVR) applications. In addition to the embedded applications, the STB 70 may also be configured to run browser-based or web applications, often referred to as Declarative Application Environment (DAE) applications. In contrast to an embedded application, a browser-based application is accessed via a web browser over a network, such as the Internet or an intranet. The browser-based application is generally a software application coded in a browser-supported language, such as HyperText Markup Language (HTML), JavaScript, Java, ECMAscript, etc. The browser-based application is reliant on a web browser implemented by the STB 70 to render the application executable. A major advantage of browser-based applications over embedded applications is the ability to update and maintain the applications without distributing and installing software on each and every STB in the IPTV environment. Browser-based IPTV-related applications include, among others, chat applications and Network Personal Video Recorder (nPVR) applications. Generally most IPTV application types can be provided both in the form of a browser-based application and as an embedded application. The latter type is typically pre-installed in the set top box and may originate from the manufacturer of the set top box or one of its partners. Browser-based applications generally have no connection to the manufacturer of the set top box and are typically provided by an IPTV provider, such as IPTV provider 108.

The STB 70 is configured for invoking IPTV-related applications and instantiating events when certain conditions are met. The certain conditions to be met may take many different forms. For example, a specific condition for a specific IPTV-related application may be based on a button on a remote control being pressed, on a selection being made by the user in a menu displayed by the set-top box on the display (television) screen, on a date and/or time of day, on a time delay, on a channel selection made by the user and/or on information provided as part of the television content (or video stream). In this regard, STB 70 stores a set of triggers, specifying IPTV-related applications/events available at the STB 70 in association with the condition to be met for launching/instantiating each IPTV-related application/event.

In accordance with an embodiment of the present invention, the IPTV provider 108 includes a Trigger Manager 150 for managing triggers in connection with the set-top boxes in the IPTV environment 100, including the triggers for subscribing STB 70 in home network 102. A description of the STB 70, the Trigger Manager 150 as well as of the manner in which the Trigger Manager 150 manages the triggers for subscribing STB 70 and other set top boxes in IPTV environment 100 in accordance with an embodiment of the invention is described in greater detail below.

Set Top Box (STB) 70

Figure 2:
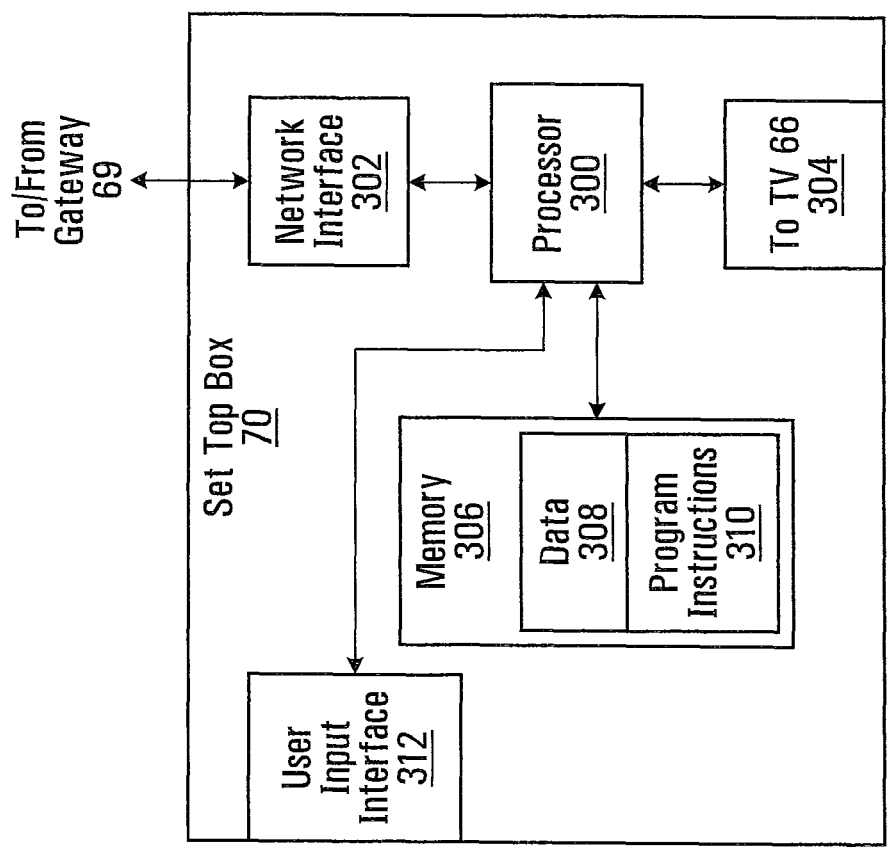
FIG. 2 is a block diagram of an apparatus implementing a set-top box (STB) suitable for used in the IPTV environment depicted in FIG. 1 in accordance with a non-limiting example of implementation of the invention.

A functional block diagram of STB 70 is depicted in FIG. 2 of the drawings. As shown, the STB 70 includes a network interface 302, a processor 300, a memory 306, a TV interface 304 and a user input interface 312.

Network interface 302 is for exchanging data with the IPTV provider 108 through gateway 69 (shown in FIG. 1), wherein the data exchanged includes media content and trigger management information. The network interface 302 is represented as a general input and output (I/O) unit in the figure. In practice, the network interface 302 could be a general input and output interface for a wired connection or in the form of a receiver/transmitter or transceiver for a wireless connection. TV interface 304 is for releasing signal for causing a display, such as TV set 66 shown in FIG. 1, to display TV content and/or other A/V content on a TV set 66 (shown in FIG. 1). The user input interface 312, which may be implementing in accordance with any suitable method known in the art, is for receiving signals conveying commands from a user operated control device, such as a remote control device. Such commands may include conventional television control commands such as, for example, channel selection and volume control. In addition to conventional television control commands, the commands may be associated with applications provided by STB 70 including IPTV-related applications. For example, the user may press a "guide" button on a remote control device (not shown in the figures) for launching an Electronic Program Guide (EPG) application.

The memory 306 stores program instructions 310 and data 308 for use by the processor 300. Amongst others, the data 308 stored in the memory 306 includes a registration table conveying a set of current triggers available at the STB 70. Each trigger in the set of current triggers may be associated with trigger attributes including an event attribute, associated with an event to be instantiated at the STB 70, and a criteria attribute, conveying a condition under which the event is to be instantiated. The events associated with the triggers may launch an IPTV-related application, such as for example a video-on-demand (VoD) application and a social networking application. The condition under which a specific event is to be instantiated many take on different forms. Amongst others, the condition for a specific IPTV-related application may be based on one or more of the following:

1. a signal received through the user input interface 312 as a result of a button on a remote control being pressed (e.g. channel selected; selected based on menu displayed on TV set 66; specific button on remote control pressed);
2. on a date and/or time of day;
3. on information/data provided as part of the television content (or video stream) received at network interface 302.

It is noted that the set of current triggers may include application-bound triggers and/or application-provisioned triggers. Application-bound triggers are triggers that exist only for the life-time of an application; once the application is exited, they no longer exist. For example, where an IPTV-related application has been selected and is currently active for an IPTV-session, there may be a need to provide another IPTV-related application for the purpose of performing some tasks during the session. Note that there may consequently be multiple IPTV-related applications running in parallel during at least a portion of the IPTV session as the applications can launch other applications that generally become active only for handling the specific task and are then deactivated once more. Application-provisioned triggers are similar except that they exist beyond the life-time of the application but no longer exist once the set-top box is rebooted. Application-bound triggers and application-provisioned triggers are known in the art to which the present application pertains and as such will not be described in greater detail here.

The program instructions 310, when executed by processor 300, implement functionality required for running various IPTV-related applications providing IPTV services to the user 65. Amongst others, the program instructions 310 configure processor 300 to process a stream of packets conveying TV and/or other A/V content and received via the network interface 302 in order to generate A/V signals, which are then released at interface 304 for delivery to the TV set 66 in order to present the TV and/or other A/V content to the user. The program instructions 310 also cause IPTV-related applications to be instantiated at the STB 70 when certain conditions are met, wherein the conditions are specified by the set of current triggers stored in the data 308 portion of memory unit 306. Optionally, the program instructions 310 also include instructions for implementing a web browser application that may be employed for the purpose of running browser-based IPTV-related applications.

Figure 3:
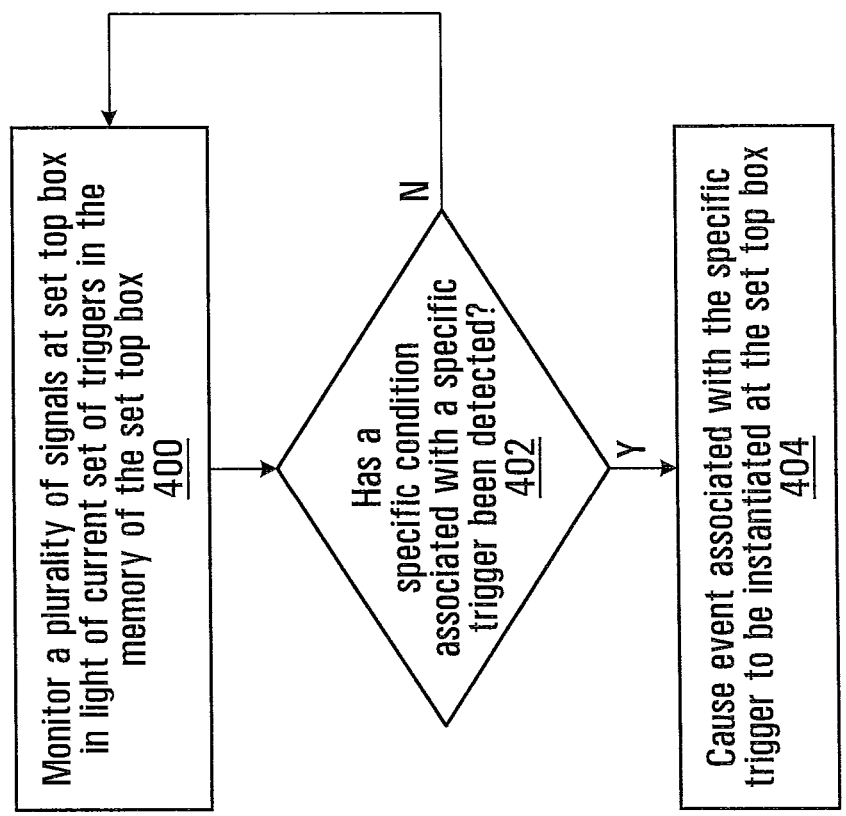
FIG. 3 shows a process implemented by the STB shown in FIG. 2 in accordance with a non-limiting example of implementation of the invention for instantiating a specific event when a specific condition is met.

With reference to FIGS. 2 and 3, a specific example of a process for instantiating a specific event at STB 70, as implemented by the program instructions 310 executed by processor 300, will now be described.

As shown, at step 400, the processor 300 monitors various signals occurring at the STB 70 for the purpose of determining whether an event, such launching an IPTV-related application, is to be instantiated at the STB 70. Amongst others, the processor 300 is configured for monitoring signals received from a user of the STB 70 over user input interface 312, signals received at network interface 302 from external devices including for example the IPTV provider 108 (shown in FIG. 1) as well as other signals generated locally at the STB 70 in order to determine whether a condition associated with a trigger in the set of current triggers in the data portion 308 of the memory 306 of STB 70 has been met.

At step 402, the process determines if a condition associated with any of the triggers in the set of current triggers for the STB 70 has been detected. If no such condition has been detected, step 402 is answered in the negative and the process proceeds to step 400 where the processor 300 continues to monitor various signals for the purpose of determining whether an event is to be instantiated at STB 70.

If a specific condition associated with a specific trigger amongst the set of current triggers for the STB 70 has been detected, step 402 is answered in the positive and the process proceeds to step 404.

At step 404, the processor 300 causes an event associated in the memory 306 with the specific trigger that was detected to be instantiated at the STB 70. It is noted that, after the event is instantiated, the processor may continue to monitor signals occurring at the STB 70 for the purpose of determining whether another event, such launching another IPTV-related application, is to be instantiated at the STB 70. The person skilled in the art will appreciated that instantiating events at a STB 70 based on certain conditions being met can be performed in accordance to suitable methods known in the art and as such methods will not be described further here.

As mentioned above the processor 300 of STB 70 makes use of a set of current triggers stored in the data portion 308 of memory 306 when monitoring various signals occurring at the STB 70 for the purpose of determining whether an event, such launching an IPTV-related application, is to be instantiated at the STB 70. Over time, the set of current triggers stored in memory unit 306 may need to be modified to reflect new IPTV-related applications made available by the IPTV provider 108 (shown in FIG. 1) and/or to reflect IPTV-related applications that are no longer available. In this regard, the STB 70 also implements functionality for managing the set of current triggers stored in memory unit 306 in accordance with a specific example of implementation of the present invention.

Amongst other, the processor 300 of STB 70 is programmed to periodically communicate with the Trigger Manager 150 (shown in FIG. 1) in order to obtain update information in connection with the set of current triggers stored in the data portion 308 of memory 306.

Figure 4:
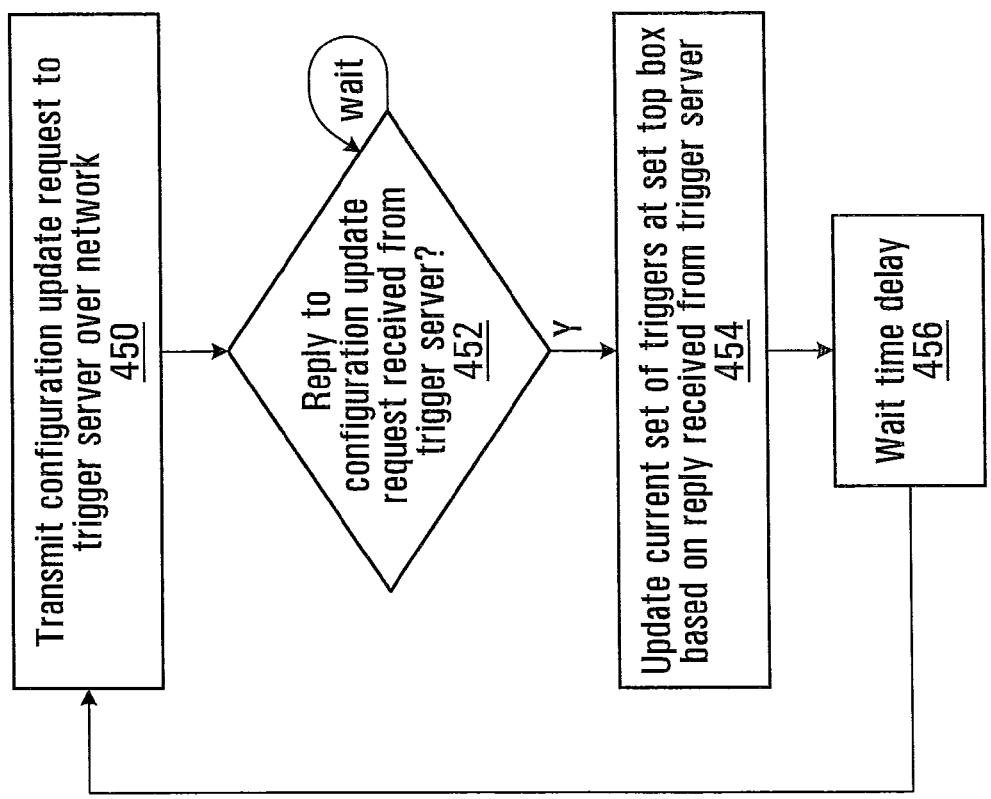
FIG. 4 shows another process implemented by the STB shown in FIG. 2 for managing triggers in accordance with a non-limiting example of implementation of the invention.

With reference to FIGS. 2 and 4, a specific example of a process for managing triggers in connection with STB 70, as implemented by the program instructions 310 executed by processor 300, will now be described.

As shown, at step 450, the processor 300 transmits a message conveying a configuration update request to the Trigger Manager 150 (shown in FIG. 1) associated with the IPTV provider 108 (also shown in FIG. 1) through the network interface 302. Step 450 may be initiated on power up of the STB 70 or at time intervals according to a schedule as will be described below. In a specific implementation, the Trigger Manager 150 includes a Trigger Server module configured for receiving and replying to configuration update requests originating from the STBs in the IPTV environment 100 depicted in FIG. 1. The Trigger Manager 150 is described in greater detail later on in the present document. The configuration update request issued by STB 70 includes information for allowing the Trigger Manager 150 to identify the STB 70 amongst the other STBs in the IPTV environment 100 (shown in FIG. 1). Any suitable manner for identifying the STB 70 may be used such as for example, but without being limited to, the Media Access Control address (MAC address) of STB 70, a serial number associated with the STB 70, a subscriber identifier associated with the subscriber of the IPTV service or any other suitable manner of identifying the STB 70 amongst the other STBs in the IPTV environment 100. In a specific implement, a packet-based IP protocol is used to send the message conveying the configuration update request to the Trigger Manager 150 (shown in FIG. 1) associated with the IPTV provider 108 (also shown in FIG. 1). The process then proceeds to step 452.

At step 452, where the processor 300 waits for a reply to the configuration update request to be received at the STB 70 through the network interface 302. If no reply to the configuration update request is received within a maximum time delay, the processor 300 may consider that there was a communication problem and may proceed in transmitting a new configuration update request. Alternatively, or following a certain number of failed attempts to obtain a response to a configuration update request, the process may abort. Once the process is aborted, it may be re-initiated when the STB 70 is rebooted. When a reply to the configuration update request is received, the process proceeds to step 454.

At step 454, the processor 300 processes the reply received from the Trigger Manager 150. The reply includes information for updating the set of current triggers stored in memory 306. The information for updating the set of current triggers may be conveying in a number of different manners. For example the information may convey only the modifications to be made to the set of current triggers in the form of triggers to be added, triggers to be modified and/or triggers to be removed (deleted) from memory 306. In such cases the processor 300 uses the information in the reply to modify the set of current triggers stored in memory 306. It is noted that in certain cases the information received may convey that no modifications to the existing set of triggers is to be made. In an alternative implementation, the information may convey a (complete) updated set of triggers. In such cases, the processor 300 uses the newly received updated set of triggers to replace the set of current triggers stored in memory 306. As a result, the set of current triggers stored in the data portion 308 of memory, which now reflects the information in the reply from the Trigger Manager 150, will be used, for example, in connection with processes of the type described above with reference to FIG. 3.

In addition to the information for updating the set of current triggers stored in memory 306, the reply may also include program instructions suitable to be executed by the processor 300 in order to implement one or more IPTV-related applications. The one or more IPTV-related applications implemented by the program instructions in the reply may be upgrades corresponding to existing IPTV-related applications implemented by program instructions 310 stored in memory 306. Alternatively, the one or more IPTV-related applications implemented by the program instructions in the reply are new IPTV-related applications. In both cases, the processor 300 uses the received program instructions in the reply to update the program instructions portion 310 of memory 306.

Following step 454, the process proceeds to step 456 where the processor 300 waits a time delay before proceeding back to step 450 and transmitting another configuration update request. The specific time delay applied at step 456 can depend on a number of factors, which may include for example the frequency of updates made by the IPTV provider 108. In a non-limiting example, the time delay may vary between one or more days to a few weeks according to a specific schedule. In a non-limiting example, the time delay is less than once a month, preferably less than two weeks and most preferably about one week. Alternatively, of in addition to this, step 450 may be initiated each time the STB 70 is powered up. In this manner, the STB 70 transmits multiple configuration update requests over time to the Trigger Manager 150 (shown in FIG. 1) associated with the IPTV provider 108 (also shown in FIG. 1) through the network interface 302 in order to receive over time multiple replies that include information for updating the set of current triggers stored in memory 306.

Trigger Manager 150

As described above, in order to manage triggers in connection with subscribing set-top boxes in the IPTV environment 100 of FIG. 1, including STB 70, the IPTV provider 108 includes a Trigger Manager 150.

Generally speaking, the Trigger Manager 150 provides tools for setting and resetting application triggers (or simply "triggers") on subscribing set-top boxes in the IPTV environment 100 shown in FIG. 1. The Trigger Manager 150 may also provide functionality for securing access in connection with the introduction of new triggers in the IPTV environment 100, for managing conflicts and overlaps between new and existing triggers and for auditing trigger requests. Triggers can be with application-bound triggers or application-provisioned triggers. Application-bound triggers are triggers that exist only for the life-time of an application; once the application is exited, they no longer exist. Application-provisioned triggers are similar except that they exist beyond the life-time of the application but no longer exist once the set-top box is rebooted.

Triggers can be used for different purposes including the following examples:
  Present to a new IPTV customer a periodic notification proposing to set his/her final programming;
  Start an enhanced application (e.g., navigation to a web site) when a particular channel is selected;
  Start a voting application a certain number of minutes before/after the end of a show when the channel on which the show is airing is selected;
  And many others.

Figure 5:
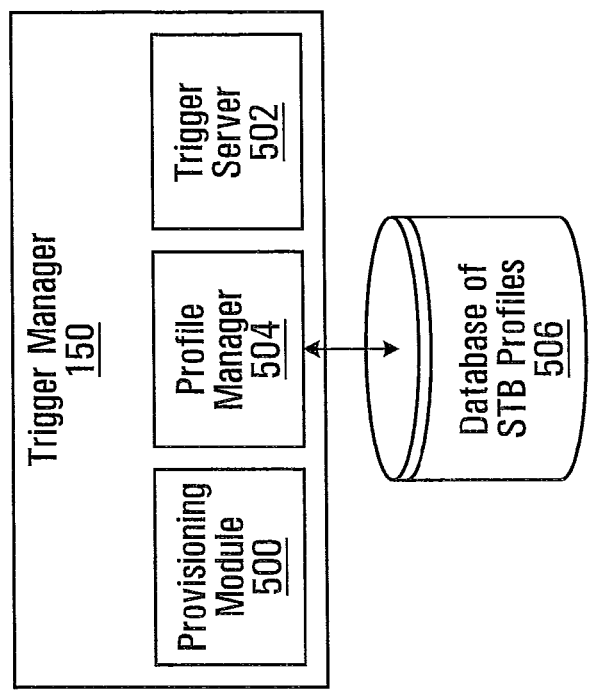
FIG. 5 is a functional block diagram of a Trigger Manager for use in the IPTV environment depicted in FIG. 1 in accordance with a non-limiting example of implementation of the invention.

A functional block diagram of an example of implementation of Trigger Manager 150 is depicted in FIG. 5 of the drawings. As shown, the Trigger Manager 150 includes a provisioning module 500, a Trigger Server 502 and a Profile Manager 504. It is to be appreciated that practical implementation of Trigger Manager 150 may include components in addition to the ones shown in FIG. 5. For the purpose of simplicity, components of the Trigger Manager 150 not required for the understanding of the invention have been omitted from the description and drawings.

Provisioning module 500 provides a standard application program interface (API) to authorized applications in order to allow such applications to add and remove triggers in the IPTV environment 100. In a specific example, the Provisioning Module may receive requests to register new triggers. A request to register a new trigger can be directed to all the subscribing set-top boxes in the IPTV environment 100, the subscribing set-top boxes within a specific group or a single subscribing set-top box. As described above, each trigger may be associated with a criteria attribute and an event attribute, wherein the event attribute defines an event to be instantiated by a set-top box, and wherein the criteria attribute defines of a condition under which the event is to be instantiated. The Provisioning module 500 interacts with the Profile Manager 504 to identify a subset of the triggers for which a request to register was received as valid triggers to be registered in association with individual set-top boxes. Amongst other, the Provisioning module 500 may provide conflict detection and resolution functionality in connection with a new trigger to be registered and current triggers for a given set top box. The valid triggers are provided to the Profile Manager 504, which updates the triggers in association with each set-top box.

Profile Manager 504 interacts with a database of subscribing set-top box profiles 506 and manages exchanges with this database. The database of subscribing set-top box profiles 506 associates subscribing set-top boxes in the IPTV environment 100 with respective sets of triggers. Amongst others, the Profile Manager 504 interacts to the Provisioning module 500 in order to update the sets of triggers, including adding new triggers and removing existing triggers, associated with one or more of the subscribing set-top box profiles in the database 506. The Profile Manager 504 may also provide the necessary functionality for creating/deleting set-top box profiles in the database 506 as needed as new subscribers are added and/or as former subscribers are removed. The Profile Manager 504 thus acts as custodian of the triggers. The Profile Manager 504 also interacts with Trigger Server 502 in order to reply to configuration update requests originating from set top boxes in the IPTV environment 100 of FIG. 1 and provide information for updating sets of current triggers at the set top boxes. Although the database of subscribing set-top box profiles 506 has been shown in FIG. 5 as a component external to the Profile Manager 504, it is to be appreciated that the database of subscribing set-top box profiles 506 may form an integral part of Profile Manager 504 in some alternative examples of implementation of the invention.

The Trigger Server 502 handles communications with the set top boxes in the IPTV environment 100 of FIG. 1, and in particular configuration update requests originating from the set top boxes including STB 70. In response to a configuration update request originating from a specific set top box, the Trigger Server 502 interacts with the Profile Manager 504 to identify in the database of subscribing set-top box profiles 506 a profile corresponding to the specific set top box from which the request originated. If a profile is identified, the Profile Manager 504 provides the corresponding set of triggers stored in the database 506 to the Trigger Server 502, and the Trigger Server 502 in turn issues a reply message to the set top box from which the request originated including the set of triggers in the identified profile.

The Provisioning module 500, Profile Manager 504 and Trigger server 502 as well as the functionality they may provide will now be described in greater detail below with reference to FIGS. 6 to 11.

Trigger Manager 150 and Provisioning Module 500

As mentioned above, Provisioning module 500 is intended to provide external IPTV-related applications access to the Trigger Manager 150 to register and remove triggers on set top boxes in the IPTV environment 100 of FIG. 1.

Figure 6:
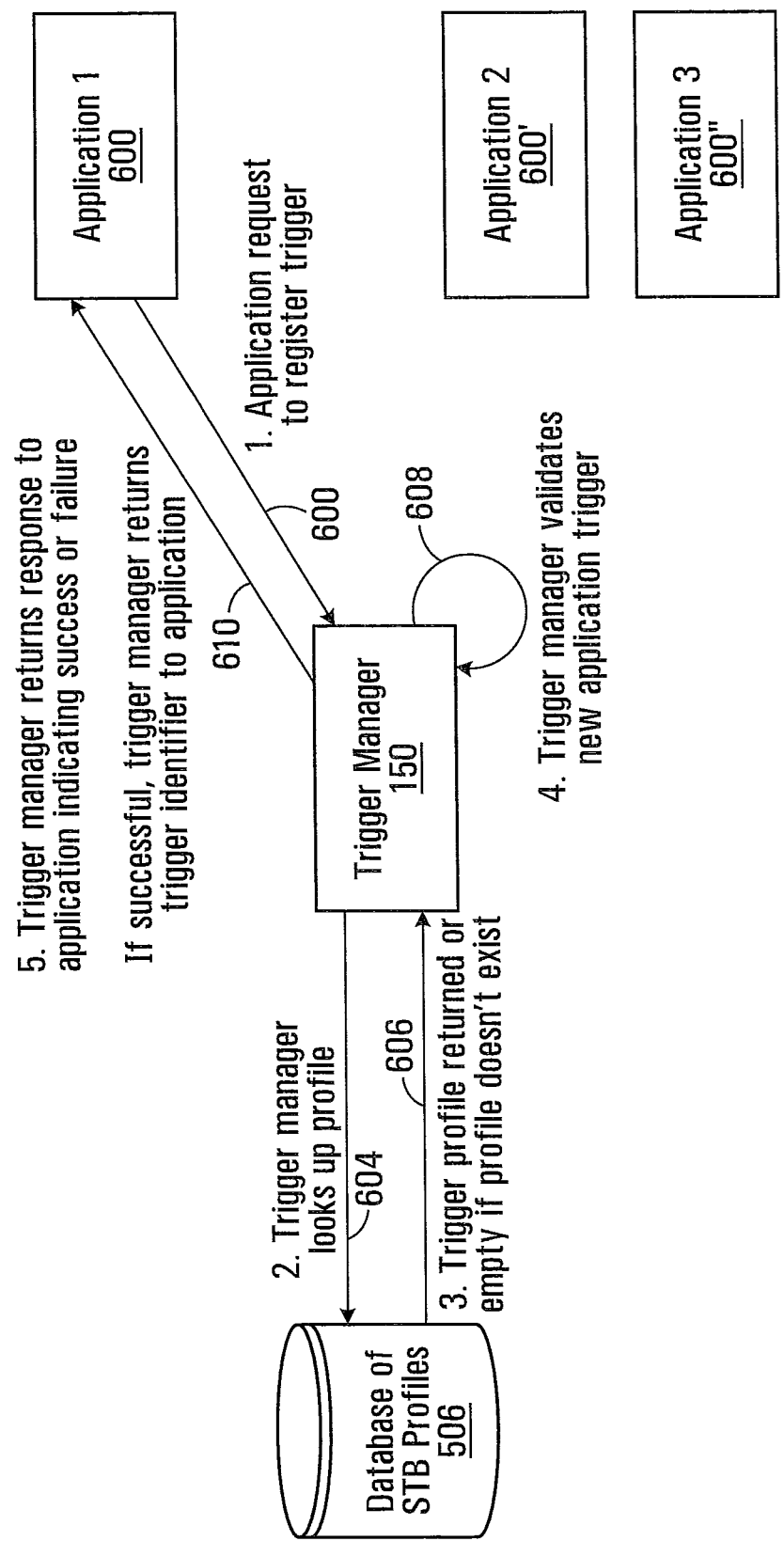
FIG. 6 is a diagram showing interactions between the Trigger Manager shown in FIG. 5 and IPTV applications in connection with the registration of a new trigger in the IPTV environment depicted in FIG. 1 in accordance with a non-limiting example of implementation of the invention.
Figure 7:
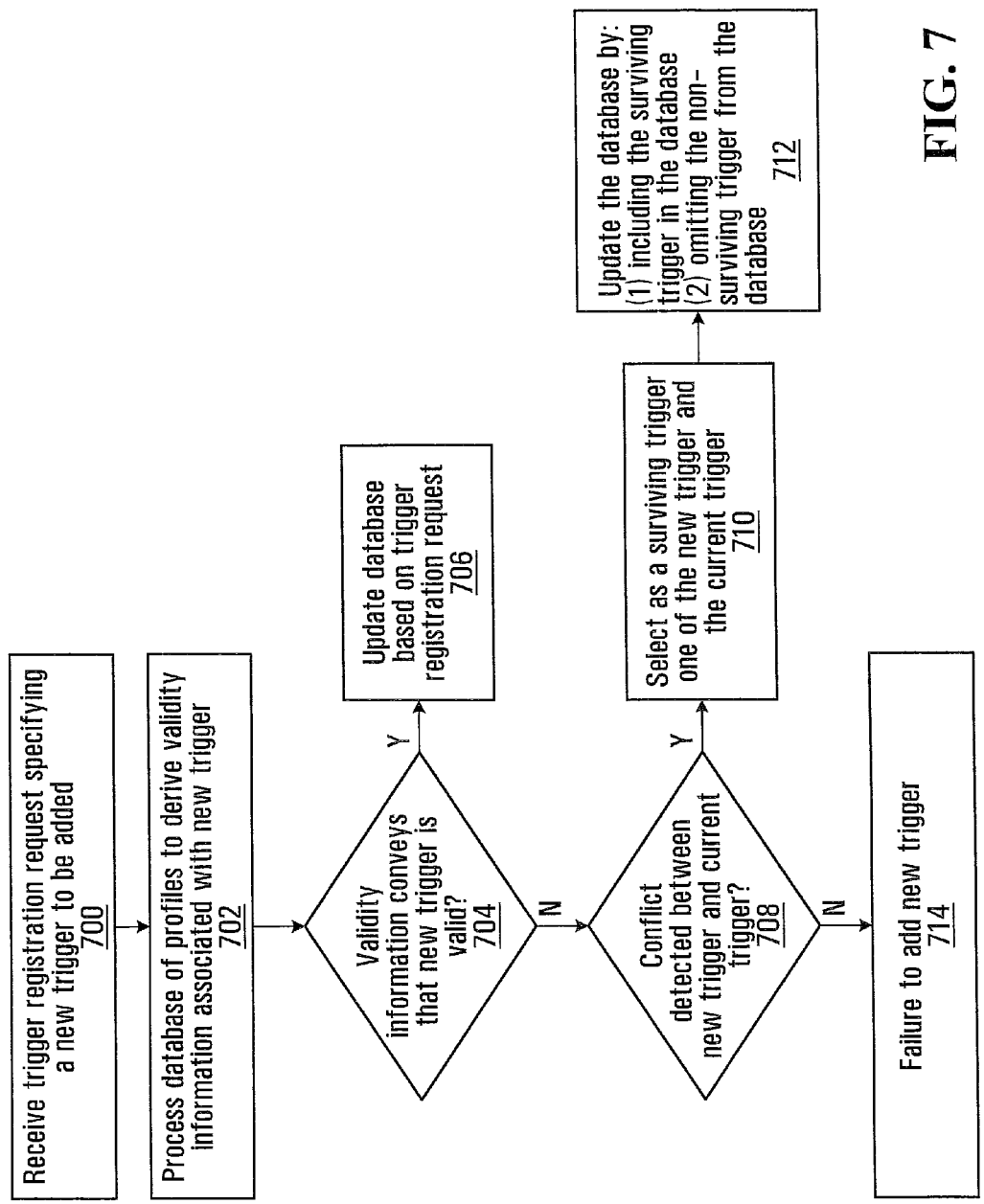
FIG. 7 shows a process implemented by the Trigger Manager shown in FIG. 5 for registering a new trigger in accordance with a non-limiting example of implementation of the invention.
Figure 8:
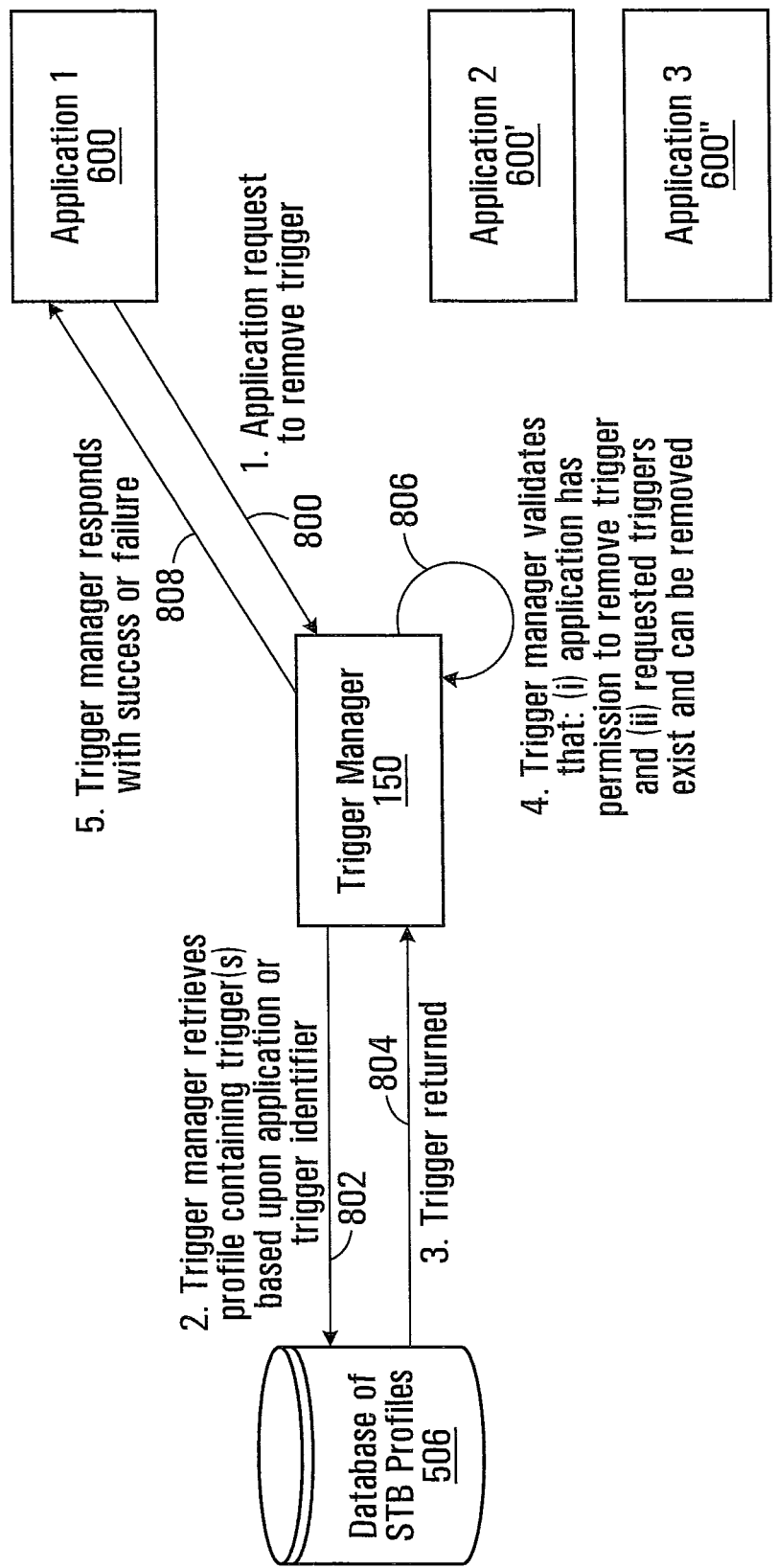
FIG. 8 is a diagram showing interactions between the Trigger Manager shown in FIG. 5 and IPTV applications in connection with the removal of a trigger in the IPTV environment depicted in FIG. 1 in accordance with a non-limiting example of implementation of the invention.
Figure 9:
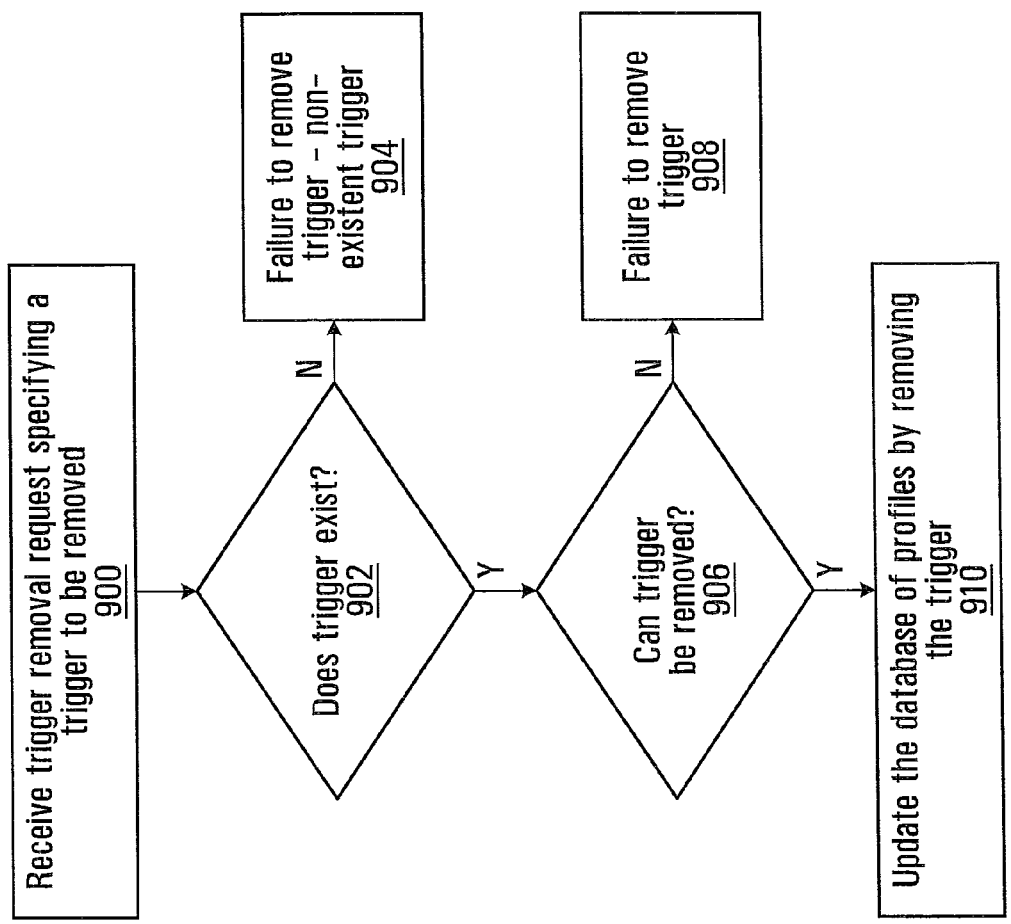
FIG. 9 shows a process implemented by the Trigger Manager shown in FIG. 5 for removing a trigger from one or more set top box profiles in accordance with a non-limiting example of implementation of the invention.

FIGS. 6 and 7 provide high level data flows and associated process for registering triggers using Trigger Manager 150. FIGS. 8 and 9 provide high level data flows and associated process for removing triggers using Trigger Manager 150.

FIG. 6 depicts interactions between an IPTV-related application 600, the Trigger Manager 150 and the database of subscribing set-top box profiles 506, wherein the IPTV-related application 600 is seeking to register a new trigger in connection with one or more set top boxes in the IPTV environment 100 (shown in FIG. 1). It is noted that IPTV-related applications 600' and 600" shown in FIG. 6 implement similar processes in connection with the registration of triggers as IPTV-related application 600 and, as such, interactions between IPTV-related applications 600' and 600" with respect to registration of triggers will not be described further here.

As shown, at step 602, IPTV-related application 600 sends a trigger registration request to the Trigger Manager 150. The trigger registration request may convey, for example, an application identifier, one or more set top boxes for which the trigger is to be registered and trigger attributes, including for example an event attribute associated with an event to be instantiated at the set-top box, and a criteria attribute conveying a condition under which the event is to be instantiated.

The Trigger Manager 150, through the Provisioning module 500 (shown in FIG. 5) receives the trigger registration request.

At step 604, the Trigger Manager 150 issues a look up instruction, through Profile Manager 504 (shown in FIG. 5), to look up the profiles associated with the one or more set top boxes specified by the trigger registration request and for which the new trigger is to be registered.

At step 606, in response to the look-up operation, the identified set top box profiles are returned to the Trigger Manager 150. In the particular embodiment described, the identified set top box profiles are returned to the Profile Manager 504 which then forwards them to the Provisioning module 500 (both shown in FIG. 5) of Trigger Manager 150.

At step 608, the Trigger Manager 150 processes the trigger registration request received from IPTV-related application 600 in light of the identified set top box profiles received at step 606 to derive validity information associated with a new trigger specified by the trigger registration request. The validity information may apply any suitable rules in order to identify and reduce the occurrences of conflicting conditions for launching an application and/or to reduce resource overload. In a first example, deriving validity information associated with the new trigger includes determining if a conflict exists between the new trigger and a current trigger in the identified set top box profiles. For example, a conflict may exist if a criteria attribute for the new trigger overlaps (or is the same as) a criteria attribute of an existing trigger. In a second example, deriving validity information associated with the new trigger includes determining if a threshold number of triggers has been exceeded in connection with one or more of the subscribing set-top box profiles amongst the identified set top box profiles. If the threshold number of triggers has been exceeded in connection with any one of the one or more of the subscribing set-top box profiles amongst the identified set top box profiles, the derived validity information may indicate that the new trigger is not valid. The threshold number of triggers may be a fixed number or alternatively may be conditioned based on the specific set top boxes associated with the individual profiles and/or be conditioned based on the type of applications themselves. For example, applications requiring a greater amount of computing power may be weighted differently from applications whose computing power requirements is lower when determining if the threshold number of triggers has been exceeded. In a third example, deriving validity information associated with the new trigger includes determining if the subscribing set-top boxes associated with the identified profiles have sufficient resources to instantiate the event defined by the event attribute of the new trigger. If it is determined that any one of the subscribing set-top boxes associated with the identified profiles does not have sufficient resources to instantiate the event defined by the event attribute of the new trigger, the derived validity information may indicate that the new trigger is not valid.

If the derived validity information conveys that the new trigger is valid, the Trigger Manager 150 causes the identified set top box profiles in database 506 to be modified to reflect the addition of the new trigger. The process then proceeds to step 610 with an indication of that the registration of the trigger was a success.

In the derived validity information conveys that the new trigger is not valid, the Trigger Manager 150 may proceed to step 610 with an indication of that the registration of the trigger was a failure.

Optionally, when the derived validity information conveys that the new trigger is not valid due to a conflict with an existing trigger, the Trigger Manager 150 may attempt to resolve this conflict. The conflict may be resolved in accordance with different approaches which may or may not involve the intervention of a human operator at the IPTV provider 108 side. Generally speaking, the resolving a conflict detected between a new trigger and a current trigger will include selecting one of the new trigger and the current trigger as a surviving trigger and selecting the other one of the new trigger and the current trigger as a non-surviving trigger. The specific criteria applied for selecting between the new trigger and a current trigger are beyond the scope of the present application and as such will not be described further here. Once the surviving trigger and the non-surviving trigger are selected, the Trigger Manager 150 causes the identified set top box profiles in database 506 to be modified so that the surviving trigger is included in the identified set top box profiles and so that the non-surviving trigger is omitted from (or removed from) the identified set top box profiles. In dependence of whether or not the new trigger was selected as the surviving trigger, the Trigger Manager 150 may proceed to step 610 with a corresponding indication of whether the registration of the trigger was a failure or a success.

At step 610, the Trigger Manager 150 returns a response to the IPTV-related application 600 conveying whether the registration of the trigger was a success or failure.

With respect to the validity information, it is noted that depending on whether the trigger registration request transmitted from the IPTV-related application 600 is associated with a single specific subscribing set-top box or to a group including two or more subscribing set-top boxes, the manner in which the validity information is derived by the Trigger Manager 150 may differ.

As indicated above, the trigger registration request transmitted from the IPTV-related application 600 may be associated with a single specific subscribing set-top box corresponding to a profile in the database of subscribing set-top box profiles 506. In such a case, deriving the validity information associated with the new trigger may be effected at least in part by processing the set of triggers in the profile corresponding to the single specific subscribing set-top box. When the validity information conveys that the new trigger is valid for the specific subscribing set-top box, the Trigger Manager 150 causes the profile associated with the specific subscribing set-top box in the database of subscribing set-top box profiles 506 to be modified to reflect the addition of the new trigger.

As indicated above, the trigger registration request transmitted from the IPTV-related application 600 may alternately be associated with a group of subscribing set-top boxes corresponding to a group of profiles in the database of subscribing set-top box profiles 506, each profile in the group of profiles being associated with a respective set of triggers. The group of profiles may include all or fewer that all subscribing set-top box profiles in the database 506. In such a case, deriving the validity information associated with the new trigger is effected at least in part by processing the set of triggers corresponding to each profile in the group of profiles. If a first example, the validity information conveys, for each of the subscribing set-top box profiles in the group of profiles, if the trigger specified by the trigger registration request is valid. This may allow, for example, the Trigger Manager 150 to causes the identified set top box profiles in database 506 for which the validity information conveys that the new trigger is valid to be modified to reflect the addition of the new trigger while the identified set top box profiles in database 506 for which the validity information conveys that the new trigger is not valid not to be modified. If a second alternative example, the validity information conveys whether the new trigger is valid for each and every subscribing set-top box profiles in the identified group of profiles (or alternative whether the new trigger is not valid for any of the subscribing set-top box profiles in the group of profiles). In this second alternative example, Trigger Manager 150 would only modify the subscribing set-top box profiles in the identified group of profiles when the new trigger is valid for all the identified profiles.

FIG. 7 depicts a process corresponding to a portion of the interactions depicted in FIG. 6 as seen from the perspective of the Trigger Manager 150.

At step 700, the Trigger Manager 150 receives a trigger registration request associated with an IPTV-related application 600. The trigger registration request may convey, for example, an application identifier, one or more set top boxes for which the trigger is to be registered and trigger attributes, including for example an event attribute associated with an event to be instantiated at the set-top box, and a criteria attribute conveying a condition under which the event is to be instantiated.

At step 702, the Trigger Manager 150 accesses the database of subscribing set-top box profiles 506 to identify and process the profiles associated with the one or more set top boxes specified by the trigger registration request and for which the new trigger is to be registered in order to derive validity information associated with the new trigger. Any suitable approach for deriving validity information associated with the new trigger may be used, including all or some of the approaches described earlier in the present document.

If the validity information derived at step 702 conveys that the new trigger is valid, step 704 is answered in the positive and the process proceeds to step 706. At step 706, the Trigger Manager 150 causes the set top box profiles specified by the trigger registration request to be modified in database 506 to reflect the addition of the new trigger. Optionally (not shown in FIG. 7), the Trigger Manager 150 may transmit a signal to the IPTV-related application 600 from which the trigger registration request originated indicating that the registration of the trigger was a success.

If the validity information derived at step 702 conveys that the new trigger is not valid, step 704 is answered in the negative and the process proceeds to step 708.

If the new trigger was identified as not valid for a reason other than the existence of a conflict between the new trigger and a current trigger, step 708 is answered in the negative and the process proceeds to step 714. At step 714, the Trigger Manager 150 returns a response to the IPTV-related application 600 conveying that the registration of the trigger was a failure.

If the new trigger was identified as not valid due to the existence of a conflict between the new trigger and a current trigger, step 708 is answered in the positive and the process proceeds to step 710.

At step 710, the Trigger Manager 150 may attempt to resolve the conflict between the new trigger and the current trigger. The conflict may be resolved in accordance with different approaches which may or may not involve the intervention of a human operator at the IPTV provider 108 side. Generally speaking, resolving a conflict detected between the new trigger and a current trigger will include selecting one of the new trigger and the current trigger as a surviving trigger and selecting the other one of the new trigger and the current trigger as a non-surviving trigger. The specific criteria applied for selecting between the new trigger and a current trigger are beyond the scope of the present application and as such will not be described further here. The process then proceeds to step 712.

At step 712, once the surviving trigger and the non-surviving trigger are selected, the Trigger Manager 150 causes the set top box profiles specified by the trigger registration request to be modified in database 506 so that the surviving trigger is included in the profiles and so that the non-surviving trigger is omitted (or removed) from the profiles. Optionally (not shown in FIG. 7), the Trigger Manager 150 may transmit a signal to the IPTV-related application 600 from which the trigger registration request originated indicated that the registration of the trigger was a success or a failure depending on whether or not the new trigger was selected as the surviving trigger at step 710. FIG. 8 depicts interactions between an IPTV-related application 600, the Trigger Manager 150 and the database of subscribing set-top box profiles 506, wherein the IPTV-related application 600 is seeking to remove a trigger from the IPTV environment 100.

As shown, at step 800, IPTV-related application 600 sends a trigger removal request to the Trigger Manager 150. The trigger removal request may identify the trigger to be removed by specifying, for example, an application identifier associated with IPTV-related application 600. Optionally, the removal request may also identify one or more set top boxes for which the trigger is to be removed. It is noted that the identification of one or more set top boxes in the removal request may be useful in situations where some of the set top boxes would keep the trigger while others would remove it.

The Trigger Manager 150, through the Provisioning module 500 (shown in FIG. 5) receives the trigger removal request.

At step 802, the Trigger Manager 150 issues a look up instruction, through Profile Manager 504 (shown in FIG. 5), to look up the profiles in the database 506 containing the trigger that has to be removed. This may be done, for example on the basis of the application identifier conveyed by the trigger removal request. It situations where the removal request identifies one or more set top boxes for which the trigger is to be removed, the Trigger Manager 150 would look up the profiles corresponding to the specified one or more set top boxes.

At step 804, in response to the look-up operation, the identified set top box profiles are returned to the Trigger Manager 150. In the particular embodiment described, the identified set top box profiles are returned to the Profile Manager 504 which then forwards them to the Provisioning module 500 (both shown in FIG. 5) of Trigger Manager 150.

At step 806, the Trigger Manager 150 processes the identified set top box profiles in view of the trigger removal request in order to determine whether 1) the Application 600 has permission to remove the trigger; and 2) the trigger exists in the identified profiles and can be removed. If both the Application 600 has permission to remove the trigger and the trigger exists in the identified profiles and can be removed, the Trigger Manager 150 causes the identified set top box profiles in database 506 to be modified to reflect the removal of the trigger. The process then proceeds to step 808 with an indication of that the removal of the trigger was a success.

On the other hand, if the Application 600 does not have permission to remove the trigger or if the trigger does not exist in the identified profiles or cannot otherwise be removed, the process then proceeds to step 808 with an indication of that the removal of the trigger failed.

At step 808, the Trigger Manager 150 returns a response to the IPTV-related application 600 conveying whether the removal of the trigger was a success or failure.

FIG. 9 depicts a process corresponding to a portion of the interactions depicted in FIG. 8 as seen from the perspective of the Trigger Manager 150.

At step 900, the Trigger Manager 150 receives a trigger removal request associated with IPTV-related application 600. The trigger removal request may identify the trigger to be removed by specifying, for example, an application identifier associated with IPTV-related application 600.

At step 902, the Trigger Manager 150 accesses the database of subscribing set-top box profiles 506 to look up the profiles in the database 506 containing the trigger that has to be removed. This may be done, for example on the basis of the application identifier conveyed by the trigger removal request. It situations where the removal request identifies one or more set top boxes for which the trigger is to be removed, the Trigger Manager 150 would look up the profiles corresponding to the specified one or more set top boxes.

If no subscribing set-top box profiles are identified at step 902, it is determined that the trigger to be removed does not exist and the process proceeds to step 904. At step 904 the Trigger Manager 150 returns a response to the IPTV-related application 600 conveying that the removal of the trigger was a failure since the trigger does not appear to exist.

If subscribing set-top box profiles are identified at step 902, the process proceeds to step 906.

At step 906, the Provisioning module 500 of Trigger Manager 150 determines whether the trigger can be removed from the subscribing set-top box profiles. The determination may be based on any rules suitable for controlling the removal of triggers. Such rules are beyond the scope of the present application and as such will not be described further here.

If it is determined that the trigger cannot be removed, step 906 is answered in the negative and the process proceeds to step 908. At step 908 the Trigger Manager 150 returns a response to the IPTV-related application 600 conveying that the removal of the trigger was a failure since the trigger cannot be removed.

If it is determined that the trigger can be removed, step 906 is answered in the positive and the process proceeds to step 910.

At step 910, since it has been determined at steps 902 and 906 that the Application 600 has both permission to remove the trigger and that the trigger exists in the identified profiles and can be removed, the Trigger Manager 150 causes the identified set top box profiles in database 506 to be modified to reflect the removal of the trigger. At step 910 the Trigger Manager 150 may also return a response to the IPTV-related application 600 conveying that the removal of the trigger was a success.

In addition to the functionality related to registering and removing triggers, the Provisioning module may provide all or some of the following functions:

Restrict the access for registration of triggers to authorized applications and maintain respective privileges (e.g., Global, Group and Account), Priority Level (e.g., High, Medium, Low) and any other application specific parameters;

Be reachable internally within a private network operated by the IPTV operator 108 (shown in FIG. 1) and/or externally through the Internet (for $3^{rd}$ party hosted applications using secured and encrypted channels); in this sense, the Provisioning module 500 could be offered as a web service;

Expose the features offered by the MSMR environment for triggers;

Initiate the provisioning process:
  Validate account ID;
  Validate request to add a new trigger;
  Check for overlap and inconsistency issues for the user experience (ex.: two triggers on same channel selection);

Ensure proper logging of any application requests for audit purposes. Auditing may include such functions as: nightly batch process scanning the database for expired triggers and deleted accounts; properly remove related information; Log activities in audit file; provide batch activity summary (number of changes, time required, etc. . . . ); optimize database for best performance; report to alarm system on run-time errors;

Report on any problems:
  Unrecognized source;
  Database connectivity problem;
  Set top Box account not known.

The Provisioning module 500 of Trigger Manager 150 may also offer an application program interface (API) to provision single triggers or trigger sets, where the trigger sets includes multiple (usually related) triggers.

The following sections provide additional details pertaining to triggers as well as trigger registration requests and trigger removal requests. It is to be understood that the description below is intended to be one of many possible implementations of the concepts presented in the present document and are included here for the purpose of completeness.

a) Single Trigger Operations (Registering and Removing a Single Trigger)

Registering a Trigger

This operation is used to provision a trigger to the set-top boxes. It allows provisioning of a trigger to:
  A list of set-top boxes (collection of set-top box IDs); [1, n] set-top boxes;
  All set-top boxes in a list of accounts (collection of account ID); [1, n] accounts;
  All set-top boxes of accounts contained within a group (group ID from the service provider's Extended Database);
  All the set-top boxes.

The request to register a new trigger issued by an Application 600 to the Trigger Manager 150 (shown in FIG. 6 as step 602) may include one or more of the following parameters:
  Application Name (Name of the application doing the registering);
  Target Type (one of the following: TARGET_STB, TARGET_ACCOUNT, TARGET_GROUP, TARGET_ALL);
  Target (one of the following: Collection of STB IDs, Collection of Account IDs, collection of Group IDs);
  Trigger object including trigger attributes (e.g., simple attributes, criteria attributes, event attributes and data payload attributes).

Trigger Simple Attributes

A trigger object may contain one or more of the following simple attributes:

Simple Attributes

| Attribute Name | Description |
|---|---|
| TriggerID | Description:<br>Unique Identifier for the trigger; when a trigger is registered, the application requesting the registration may specify a Trigger ID. If no Trigger ID is specified, the registration may return the Trigger ID that will be required to reference this trigger in the future (ex: when the application will want to remove the trigger). Trigger IDs should be unique. In a specific implementation, an exception will be thrown by the Trigger Manager 150 (example by concluding that the new trigger is not valid) if upon invoking the registration operation of a Trigger ID already exists in the database of profiles 506.<br>Optional |
| Min | Description:<br>Controls the minimum number of times a trigger can fire. The standard behavior of a trigger is to fire once. For these attributes to be meaningful, a trigger should be set to repeat.<br>Optional<br>Default = 1 |
| Max | Controls the maximum number of times a trigger can fire. The standard behavior of a trigger is to fire once. For these attributes to be meaningful, a trigger should be set to repeat.<br>Optional<br>Default = 1 |
| Expires | Description:<br>When this DateTime value is met, or exceeded, the trigger is removed.<br>Optional<br>Default = Never expires |
| Session | Description:<br>Binds the trigger to a supplier of session data, such as FULLSCREEN. FULLSCREEN is the default or main session. A trigger cannot fire events if you reference a session that does not exist. A trigger will not fire if session = "none".<br>Optional<br>Default = FULLSCREEN |

Trigger Criteria Attributes—Time Criteria

Time criteria may be subdivided into the following sections:

Absolute time (wall-clock);
Program time (stream time);
Time controls (also called modifiers).

The trigger fires when the trigger criteria are met. The trigger fires immediately if there are no criteria specified. Firing does not automatically mean that corresponding events in the trigger are immediately instantiated. Firing of the trigger and instantiation of events by default occur at the same time, but it is possible to choose to separate the two with either the when or delay attribute. If either of these attributes is specified, the time for instantiating the events is calculated and then events will be instantiated at that time (if the trigger is still active).

| Object Name | Attribute names arid descriptions: |
|---|---|
| Absolute-TimeCriteria | begin: Beginning of the wall-clock time window. If no end value is supplied, the end-of-time value is used.<br>end: End of the wall-clock time window. If no beginning is supplied, the begin-of-time value is used. |
| Program-TimeCriteria | begin: Beginning of the stream time window relative to the program start. If no end value is supplied, the end-of-program-time value is used.<br>end: End of the stream time window relative to the program start. If no beginning value is supplied, the begin-of-program-time value is used. |
| TimeControls-Criteria (hours, minutes, seconds) | shift: If this attribute is supplied, the time-shift cannot exceed the shift value.<br>when: Relative tune for when a trigger that has fired instantiates a corresponding event. This relative time is dependent on what reference is available: the wall-clock time, the stream time, or the program-start time.<br>delay: Length of time from when a trigger fires to when a trigger that has fired instantiates a corresponding event. When a trigger fires, the instantiation of a corresponding event may be delayed by the value of delay. The delay attribute is not relative to any other attribute; rather, it is a delay from the moment that the trigger fired.<br>rearm: Triggers fire once, unless otherwise directed. The rearm value is the length of time after a trigger fires before it is rearmed (making it possible to fire again).<br>repeat: Repeats the absolute time window, by time, or by token (daily or weekly). If the repeat tunes required are greater than a week you can redeploy the trigger on the server with a new date. You should use repeat attribute for smaller time units only. Daily or weekly tokens constitute a complete set of optional tokens. If you do not use these tokens HH:MM:SS format needs to be used. |

Trigger Criteria Attributes—Stream Criteria

To watch for the specific stream data on one or more channels (pages for TT) it is possible to add one or more stream elements to the trigger definition object.

The stream match choices are cc1 to cc4, cs1 to cs7, and TT (with a specified page).

CC608 and CC708 matches are case-insensitive in the Latin space, while TT matches are case-sensitive.

| Object Name | Attribute names and descriptions: |
|---|---|
| StreamCriteria | channels: Indicates which CC or TT channel to watch. The CC608 choices are CC1 thru CC4; the CC708 choices are cs1 thru cs7. For TT, the match criteria include the page to match against.<br>match: The data to match with against the CC or TT stream.<br>By adding "&" to the front of the match (after the page for TT), you can "and" this comparison with others of the same channel. |

Trigger Criteria Attributes—Program Criteria

Attributes that define program-based triggers are described in the following table.

| Object Name | Attribute names and descriptions: |
|---|---|
| MetadataCriteria | channel: Specific channel number.<br>channelrange: Inclusive, comma separated, range of channels. (ex: 1024, 1027 represents all channels from 1024 to 1027 including 1024 and 1027).<br>title: Text contained within the program title.<br>episode: Text contained within the program episode title.<br>callsign: An exact match of a transmitting station. For example, HBO does not match HBO-W.<br>callsignpartial: A match if callsign starts with this text. For example, HBO matches HBO-W. |

Trigger Event Attributes

Examples of some event attributes that define program-based triggers are described in the following table.

| Object Name | Attribute names and descriptions: |
|---|---|
| Event | type: One of the following types:<br>EVENT: Fires the event to Microsoft Mediaroom Presentation Framework (PF).<br>REDIRECT: Specifying this attribute results in firing another trigger, which may in turn fire another. The trigger is searched for by its ID, and if found, its events are fired.<br>NAVIGATION: Loads the Microsoft Mediaroom PF page using Navigation Manager.<br>data: Data needed depending on the type of event:<br>Event of type EVENT: data is the name of the event to fire (ex: "eventName")<br>Event of type REDIRECT: data is the id of the trigger to fire.<br>Event of type NAVIGATION: data is the MSMR PF page (ex:<br>page:storage://device/store//mpf/myApp/myApp.xml") |

Trigger Data Payload Attributes

A purpose of the data payload is to supply the trigger with data for the application to reference. In a specific example, it takes the form of a key-value map. The page mark-up can data bind to the trigger data (value) by means of the unique trigger ID and the data name (key). The value is returned to the mark-up. The use of data payload enables the IPTV application to change its behaviour or presentation based on the specific trigger that started it or any trigger that may be registered with the trigger engine. The data payload can also be expressed in a variety of languages; the data binding resolves to the current language.

| Object Name | Attribute names and descriptions: |
|---|---|
| DataPayloadElement | name: Key for the key-value map element.<br>data: Value for the key-value map element. |

Removing a Trigger

This operation flags the trigger in the database of profiles 506 for removal. The trigger will no longer be provisioned on the set-top boxes and all set-top boxes will un-provision the trigger when they next refresh their triggers. The trigger to be removed may be referenced by its Trigger ID in the request for removal of a trigger.

The removed trigger can be moved to a "history" type table/database (not shown in the figures) to provide historical reporting data.

b) Trigger set Operations

Trigger sets are designed for applications needing to provision more than one trigger, wherein the triggers are generally related to one another. They allow for bulk provisioning of triggers including the bulk registration and removal of the triggers in the trigger set.

Registering a Trigger Set

This operation is used to provision a trigger set to the set-top boxes. It allows provisioning of a collection of triggers to:

A list of set-top boxes (collection of set-top box IDs); [1, n] set-top boxes;

All set-top boxes of a list of accounts (collection of account ID); [1, n] accounts;

All set-top boxes of accounts contained within a group (group ID from service provider's Extended Database);

All the set-top boxes.

The command to register a trigger set may include the following parameters:

Application Name (Name of the application doing the registering);

Target Type (one of the following: TARGET_STB, TARGET_ACCOUNT, TARGET_GROUP, TARGET_ALL);

Target (one of the following: Collection of STB IDs, Collection of Account IDs, collection of Group IDs);

Trigger set object.

Trigger set Object Elements

A trigger set object contains the following elements:

| | |
|---|---|
| TriggerSetID | Description:<br>When a trigger set is registered, the application requesting the registration may specify a TriggerSet ID. This allows for the trigger set to be referenced in the future so it can be removed and thus all the triggers within the trigger set can be un-provisioned at once.<br>If no TriggerSet ID is specified, the registration process will not keep a specific reference to the trigger set for future use and all the triggers will be created as separate entities.<br>If multiple calls to the single trigger registration method would be required to complete the application's trigger provisioning, the registration of a trigger set may be the preferred method for performance reasons.<br>Optional |
| Triggers | Description:<br>Collection of triggers<br>Required |

Like with the single trigger registration, Trigger IDs should be unique. In a specific implementation, an exception will be thrown by the Trigger Manager 150 (example by concluding that the new trigger set is not valid) if upon invoking the registration operation of a Trigger Set the specified Trigger ID already exists in the database of profiles 506.

Removing a Trigger Set

This operation flags the trigger set and all triggers within it in the database of profiles 506 for removal. The triggers within the trigger set will no longer be provisioned on the set-top boxes and all set-top boxes will un-provision these triggers when they next refresh their triggers. The trigger set to be removed may be referenced by its TriggerSet ID in the request for removal of a trigger.

The removed trigger set and its associated triggers can be moved to a "history" type table/database (not shown in the figures) to provide historical reporting data.

Trigger Manager 150 and Trigger Server 502

As described above with reference to FIGS. 2 and 4, the STB 70 is configured for making use of a set of current triggers when monitoring monitors various signals occurring at the STB 70 for the purpose of determining whether an event, such as launching an IPTV-related application, is to be instantiated at the STB 70. The STB 70 also implements functionality required for managing the set of current triggers in accordance with a specific example of implementation of the present invention. Amongst other, STB 70 is programmed to periodically communicate with the Trigger Manager 150 in order to obtain update information in connection with the set of current triggers.

Figure 10:
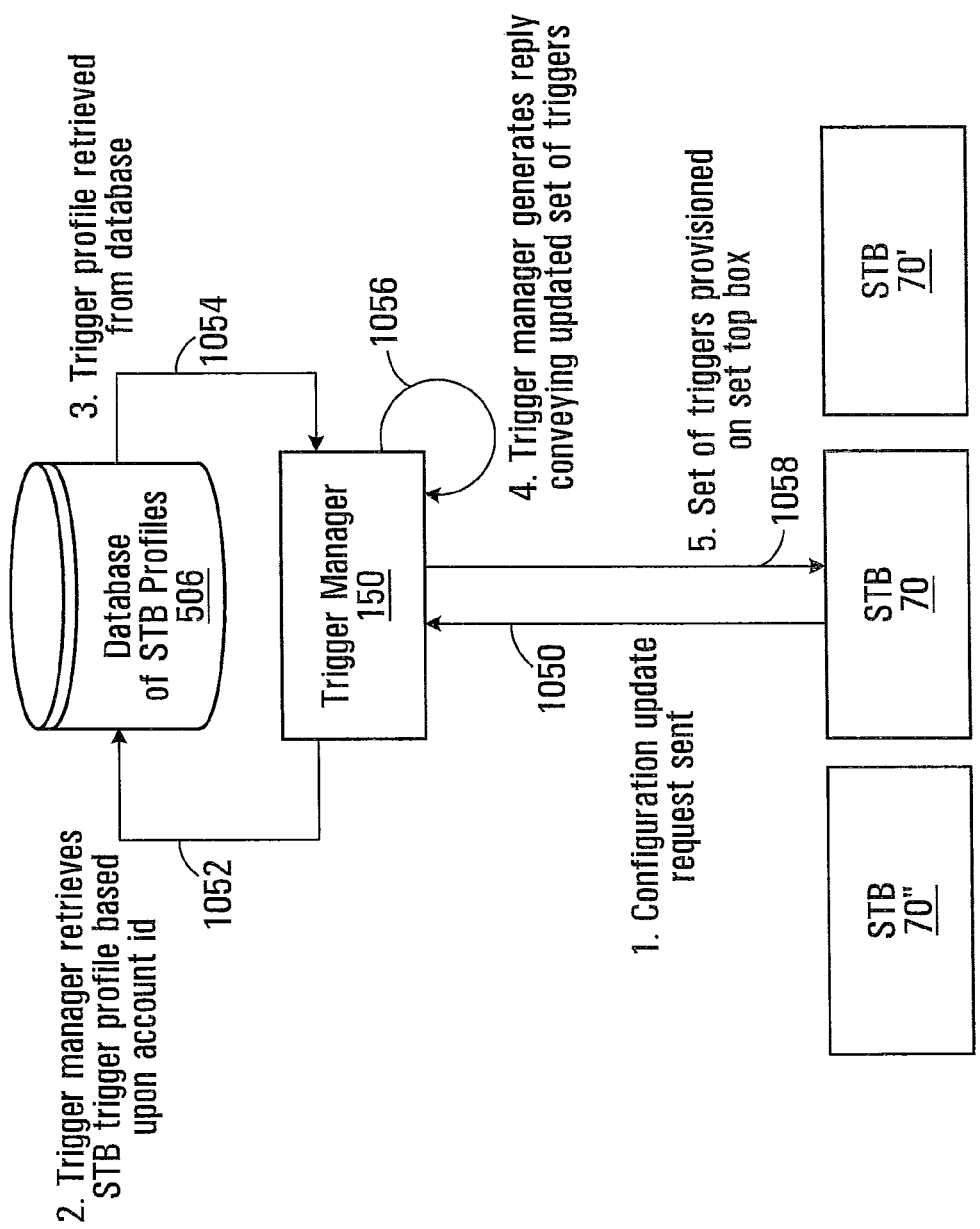
FIG. 10 is a diagram showing interactions between the Trigger Manager shown in FIG. 5 and set top boxes in the IPTV environment depicted in FIG. 1 in accordance with a non-limiting example of implementation of the invention.

FIG. 10 depicts interactions between STB 70, Trigger Manager 150 and the database of subscribing set-top box profiles 506, wherein the STB 70 is seeking to update a set of current triggers stored in a memory of STB 70. It is noted that STB 70' and STB 70" shown in FIG. 10 implement similar processes in connection with the update of the set of current triggers for STB 70 and, as such, interactions between STB 70' and STB 70" with respect to the update of their respective sets of current triggers will not be described further here.

As shown, at step 1050, STB 70 sends a configuration update request to the Trigger Manager 150. As described previously, the configuration update request includes information for allowing the Trigger Manager 150 to identify the STB 70 amongst the other STBs in the IPTV environment 100.

The Trigger Manager 150, through the Trigger Server 502 (shown in FIG. 5) receives the configuration update request.

At step 1052, the Trigger Manager 150 issues a look up instruction, through Profile Manager 504 (shown in FIG. 5), to look up the profile associated with STB 70 in database 506 based on the information identifying the STB 70 in the configuration update request.

At step 1054, in response to the look-up operation, a set top box profile associated with STB 70 is returned to the Trigger Manager 150. In the particular embodiment described, the identified set top box profile is returned to the Profile Manager 504 which then forwards it to the Trigger Server 502 (both shown in FIG. 5) of Trigger Manager 150.

At step 1056, the Trigger Manager 150, through the Trigger Server 502 generates a reply to the configuration update request for transmittal to the STB 70. The reply includes information for updating the set of current triggers stored at the STB 70.

At step 1058, the Trigger Manager 150, again through the Trigger Server 502, transmits the reply generated at step 1056 to the STB 70 so that the STB may update in its memory its set of current triggers.

Figure 11:
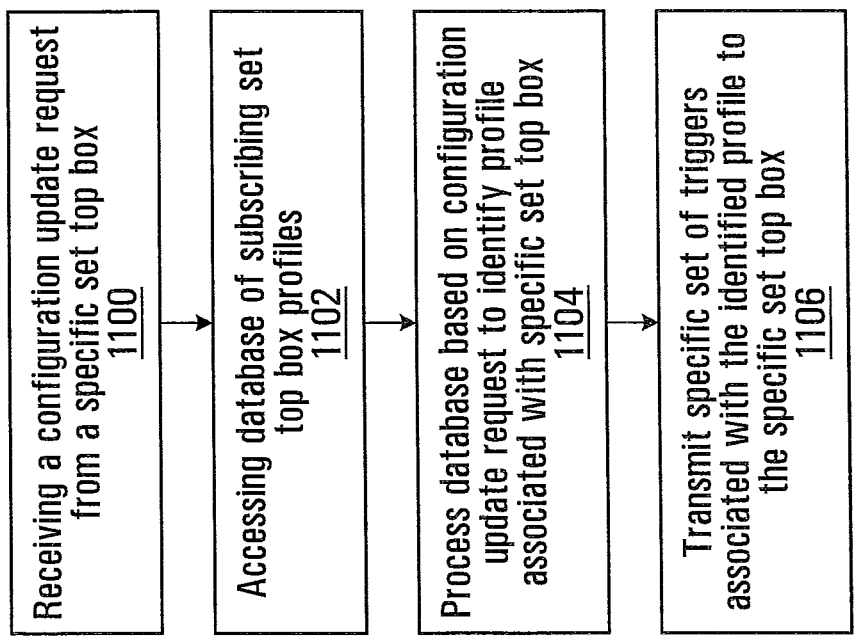
FIG. 11 shows a process implemented by the Trigger Manager shown in FIG. 5 for managing triggers in accordance with a non-limiting example of implementation of the invention.

FIG. 11 depicts a process corresponding to a portion of the interactions depicted in FIG. 10 as seen from the perspective of the Trigger Manager 150.

At step 1100, the Trigger Manager 150, through Trigger Server 502 (shown in FIG. 5) receives the configuration update request. As described previously, the configuration update request includes information for allowing the Trigger Manager 150 to identify the STB 70 amongst the other STBs in the IPTV environment 100.

At step 1102, the Trigger Manager 150 accesses database 506, through Profile Manager 504 (shown in FIG. 5), and at step 1104 processes the database 506 based on the configuration update request received at step 1100 to identify a profile associated with the specific set-top box from which the configuration update request originated.

At step 1106, the Trigger Manager 150, through Trigger Server 502 (shown in FIG. 5), transmits a reply conveying a specific set of triggers associated with the identified profile to STB 70 from which the configuration update request originated.

The Trigger Server 502 (shown in FIG. 5) can be "light" to limit the infrastructure requirements since, in practical implementations, there may be millions of subscribing set-top boxes analogous to STB 70 that may require trigger updates in the IPTV environment 100 shown in FIG. 1. Practical implementation of the Trigger Server 502 (shown in FIG. 5) should preferably be designed with scalability in mind while limiting resource usage in view of this potentially large number of subscribing set-top boxes.

Additional Functionality of the Trigger Server 502 May Include:
Be able to survive to database outages;
Get minimal logs to understand traffic patterns associated with the subscribing set top boxes;
Providing functionality for allowing Trigger Server 502 to gracefully shutdown, form example for maintenance purposes.

Optionally, the Trigger Server 502 (shown in FIG. 5) may be configured with a cache mechanism allowing it to periodically download to a local memory, through Profile Manager 504, a portion or all the information stored in the database of STB profiles 506. Such mechanism would minimize the dependency on the database since trigger updates could be provided to STB even in cases whether the database 506 is off-line. In addition, such configuration would reduce the latency between the time a configuration update request is received by the Trigger Server 502 from a STB and a reply is sent back to the STB by the Trigger Server 502 since the Trigger Server 502 would have the information stored locally and would not need to issue a request to other entities (such as the Profile Manager 504 shown in FIG. 5) to be in a position to reply to the configuration update request but rather could perform the look-up operations locally.

Practical Implementations

Those skilled in the art will appreciate that in some embodiments, one of more of the components described herein (e.g., the set top box 70 and the Trigger Manager 150) may be implemented using one or more computing apparatuses that have access to a code memory (not shown) which stores computer-readable program code (instructions) for operation of the one or more computing apparatuses. The computer-readable program code could be stored on a medium which is fixed, tangible and readable directly by the one or more computing apparatuses, (e.g., removable diskette, CD-ROM, ROM, fixed disk, USB drive), or the computer-readable program code could be stored remotely but transmittable to the one or more computing apparatuses via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof. In other embodiments, one of more of the components described herein (e.g., the set top box 70 and the Trigger Manager 150) may be implemented using pre-programmed hardware or firmware elements (e.g., application specific integrated circuits (ASICs), electrically erasable programmable read-only memories (EEPROMs), flash memory, etc.), or other related components.

In specific implementations, the set top box (STB) 70 may be embodied in any suitable computing device providing functionality for processing and rendering the IPTV media. There is a vast number of different user equipment and user devices that can take the role of set top box (STB) 70 in the home network 102. Some non-limiting examples include a decoder, computer, etc. having the capability of receiving media data from the IPTV provider 108 and gateway 69 and processing, i.e. decoding and rendering, the media data on an included or connected display screen 60. In contrast to traditional decoders and set top boxes in digital TV systems, in an IPTV system, the set top box (STB) 70 provides two-way communications on an IP network and allows for decoding streamed media. In is also noted that set top box (STB) 70 may be embodied in a mobile device, which may be wirelessly communicating with the gateway 69, and which may including a program implementing the functionality described earlier in the present document.

Certain adaptations and modifications of the described embodiments can be made. Therefore, the above discussed embodiments are to be considered illustrative and not restrictive. Also it should be appreciated that additional elements that may be needed for operation of certain embodiments of the present invention have not been described or illustrated as they are assumed to be within the purview of the person of ordinary skill in the art. Moreover, certain embodiments of the present invention may be free of, may lack and/or may function without any element that is not specifically disclosed herein.

Figure 12:
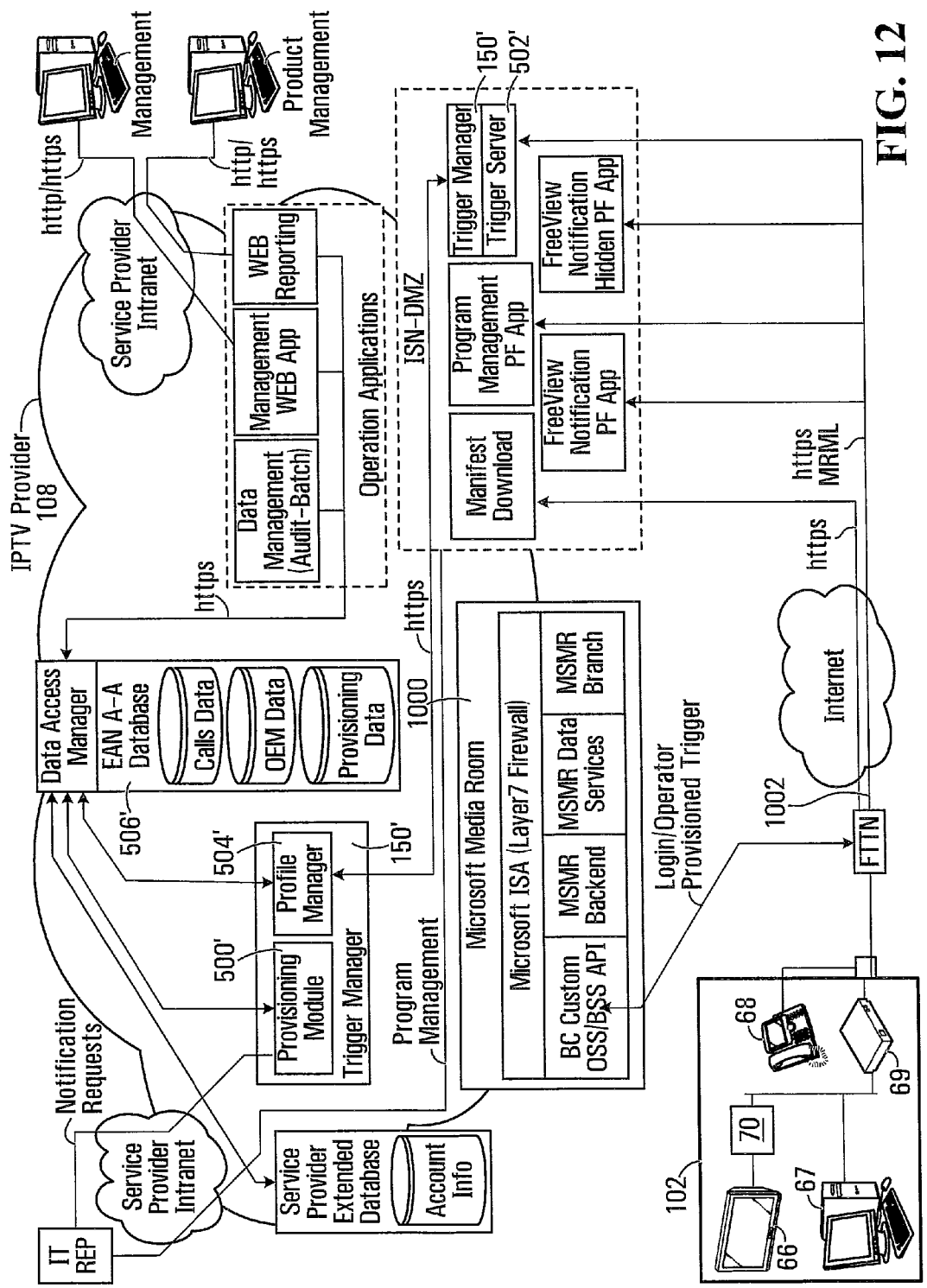
FIG. 12 is a block diagram of a portion of the IPTV environment depicted in FIG. 1 showing some components involved in managing triggers in accordance with a non-limiting example of implementation of the invention.

It is also to be appreciated that the block diagram of Trigger Manager 150 depicted in FIG. 5 illustrates the different functions that may be performed by Trigger Manager 150 according to the specific implementation described here. In practical implementations, such functions may be performed by a same physical computing device or by different physical computing devices. In addition, the devices implementing the different functions may be located in different physical areas and/or in different networks. FIG. 12 shows a detailed non-limiting example of implementation of a network operated by the IPTV provider 108 showing components involved in managing triggers in IPTV environment 100. In this non-limiting example of implementation are shown a Provisioning module 500' (analogous to Provisioning module 500 shown in FIG. 5), a Profile Manager 504' (analogous to Profile Manager 504 shown in FIG. 5), a Trigger Server 502' (analogous to Trigger server 502 shown in FIG. 5) and a database 506' (analogous to database 506 shown in FIG. 5) according to this non-limiting implementation. In this example, the Trigger Server 502' is located in a demilitarized zone (DMZ) of a network operated by the IPTV provider 108 while the Provisioning module 500', Profile Manager 504' and database 506' are located on a secure portion of a network operated by the IPTV provider 108. In this example, each subscriber has an account with the IPTV provider 108 and the account is associated with one or more set-top boxes (STBs). In the example depicted, basic IPTV services are delivered using a core Microsoft MediaRoom (MSMR) infrastructure 1000. In addition, the set-top box 70 (STB) may issue configuration update requests to Trigger server 502' using an out of band channel 1002 (e.g., Internet) which allows this communication to by-pass the core MSMR infrastructure 1000. It is to be appreciated the example depicted in FIG. 12 is but one possible example amongst many possible implementation which will become apparent to the person skilled in the art in light of the present application.

In the IPTV environment 100 of FIG. 1, the management of triggers is provided using a client/server type arrangement which the STB 70 issues configuration update requests to a Trigger Server 502 and the Trigger Server 502 replies to these requests.

Figure 13:
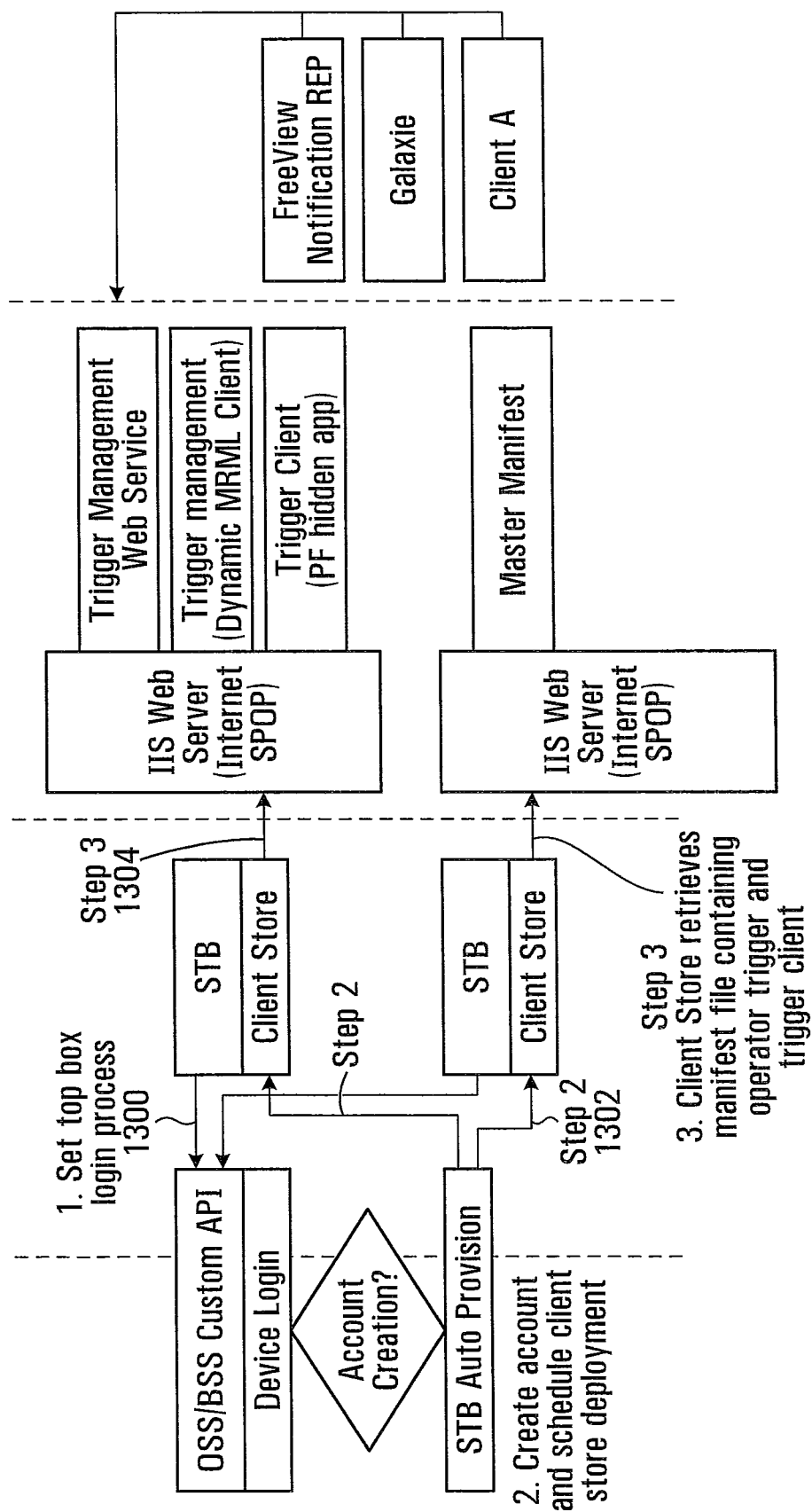
FIG. 13 shows a process for deploying an initial Operator Provisioned Trigger and a Trigger Client in set-top boxes in the IPTV environment depicted in FIG. 1 in accordance with a non-limiting example of implementation of the invention.

FIG. 13 of the drawings shows a non-limiting example of a process for deploying an initial Operator Provisioned Trigger and a Trigger Client in set-top boxes in the IPTV environment 100 including a network of the type depicted in FIG. 12. In this non-limiting example, the Trigger Client implements, amongst others, a process of the types described in connection with FIG. 4 for managing a set of triggers at a set top box.

Specifically, at step 1300, the set-top box booting sequence gets the STB 70 to register/login with the IPTV MSMR Core 1000 through the IPTV provider's 108 custom OSS/BSS API code. This login process validates if the STB 70 is linked to an account/profile and in the negative will initiate the proper provisioning activities. This may require scheduling a client store deployment activity.

At step 1302, the STB will download a Master Manifest file from the IPTV MSMR Core 1000 in which the Operator Provisioned Trigger and the Trigger Client will be defined. This definition instructs the STB to access the Trigger Server 502' (URL) based on a specific schedule.

The Operator Provisioned Trigger and the Trigger Client are resident in the STB until refreshed through another Master Manifest file update. The Operator Provisioned Trigger will re-aim at boot sequence and still run when the STB is in standby mode.

At this step, the Trigger Client running on the STB is set to operate with the Trigger Manager, which was described previously in the present document. In a legacy scenario, i.e., for IPTV customers provisioned prior to deployment of the Trigger Manager, the login process can be configured to validate if the Operator Provisioned Trigger and Trigger Client were previously deployed (using MSMR API to validate Client Store content) and in the negative, can initiate the same process as previously described by scheduling a client store download.

Although various embodiments of the invention have been described and illustrated, it will be apparent to those skilled in the art that numerous modifications and variations can be made without departing from the scope of the invention, which is defined in the appended claims.

The invention claimed is:

1. A method for managing triggers for a plurality of subscribing set-top boxes in an interactive television environment, said method comprising:
   a) providing a database of subscribing set-top box profiles, the database of profiles associating subscribing set-top boxes with respective sets of triggers;
   b) in response to receipt of a trigger registration request:
      i) processing the trigger registration request in combination with information in the database of subscribing set-top box profiles to derive validity information associated with a new trigger specified by the trigger registration request, the validity information conveying whether the new trigger is valid for at least one specific subscribing set-top box; and
      ii) selectively updating the database based on the trigger registration request in dependence on the derived validity information,
   wherein the deriving validity information associated with the new trigger includes determining whether a threshold number of triggers has been exceeded in connection with the at least one specific subscribing set-top box.

2. The method defined in claim 1, wherein the new trigger specified by the trigger registration request is associated with trigger attributes including:
   i) an event attribute associated with an event to be instantiated at a set-top box; and
   ii) a criteria attribute conveying a condition under which the event is to be instantiated.

3. The method defined in claim 1, wherein the received trigger registration request is associated with at least one specific subscribing set-top box corresponding to a profile in the database of subscribing set-top box profiles.

4. The method defined in claim 3, wherein deriving validity information associated with the new trigger includes determining if there exists a conflict between the new trigger and at least one current trigger.

5. The method defined in claim 3, wherein selectively updating the database of subscribing set-top box profiles includes resolving a conflict detected between the new trigger and a current trigger.

6. The method defined in claim 5, wherein resolving the conflict detected between the new trigger and the current trigger includes selecting one of the new trigger and the current trigger as a surviving trigger and selecting the other one of the new trigger and the current trigger as a non-surviving trigger.

7. The method defined in claim 6, wherein selectively updating the database of subscribing set-top box profiles includes:
   a) including the surviving trigger in the set of triggers in the profile associated with the at least one specific subscribing set-top box; and
   b) omitting the non-surviving trigger from the set of triggers of the profile associated with the at least one specific subscribing set-top box.

8. A method defined in claim 3, wherein the new trigger is associated with trigger attributes including an event attribute associated with an event to be instantiated at a set-top box, wherein deriving validity information associated with the new trigger includes determining whether the specific subscribing set-top box has sufficient resources to instantiate the event defined by the event attribute of the new trigger.

9. The method defined in claim 1, wherein the received trigger registration request is associated with a single specific subscribing set-top box corresponding to a profile in the database of subscribing set-top box profiles, the profile corresponding to the single specific subscribing set-top box being associated with a specific set of triggers.

10. The method defined in claim 9, wherein accessing the database of subscribing set-top box profiles to derive the validity information includes deriving the validity information at least in part by processing the set of triggers in the profile corresponding to the single specific subscribing set-top box.

11. The method defined in claim 9, wherein selectively updating the database of subscribing set-top box profiles includes adding the trigger specified by the trigger registration request to the set of triggers in the profile corresponding to the single specific subscribing set-top box when the validity information conveys that the trigger specified by the trigger registration request is valid for the specific subscribing set-top box.

12. The method defined in claim 1, wherein the received trigger registration request is associated with a group of subscribing set-top boxes corresponding to a group of profiles in the database of subscribing set-top box profiles, each profile in the group of profiles being associated with a respective set of triggers.

13. The method defined in claim 12, wherein accessing the database of subscribing set-top box profiles to derive the validity information includes deriving the validity information at least in part by processing the set of triggers corresponding to each profile in the group of profiles.

14. The method defined in claim 13, wherein the validity information conveys, for each of the subscribing set-top box profiles in the group of profiles, if the trigger specified by the trigger registration request is valid.

15. The method defined in claim 14, wherein selectively updating the database of subscribing set-top box profiles includes adding the trigger specified by the trigger registration request to the set of triggers corresponding to specific subscribing set-top box profiles for which the derived validity information conveys that the trigger specified by the trigger registration request is valid.

16. The method defined in claim 12, wherein the group of profiles includes all subscribing set-top box profiles in the database.

17. The method defined in claim 12, wherein the group of subscribing set-top box profiles includes a subset of the subscribing set-top box profiles in the database, at least one subscribing set-top box profile in the database being excluded from the subset of subscribing set-top box profiles.

18. The method defined in claim 1, wherein said method comprises transmitting over a network at least some of the sets of triggers in the database to corresponding subscribing set-top boxes.

19. The method defined in claim 18, where said sets of triggers include at least one application-bound trigger.

20. The method defined in claim 18, where said sets of triggers include at least one application-provisioned trigger.

21. The method defined in claim 1, wherein said method comprises providing an application program interface (API) module for providing the trigger registration request.

22. The method defined in claim 1, wherein in response to receipt of a trigger removal request specifying a trigger to be removed, updating the database of subscribing set-top box profiles by removing from at least one of the sets of triggers in the database the trigger specified by the trigger removal request.

23. A system for use in an interactive television environment, said system comprising a computing device including a processor programmed to implement the method for managing triggers defined in claim 1.

24. A non-transitory computer readable storage medium storing computer-readable instructions which, when executed by a processor in a computing apparatus, implement the method for managing triggers defined in claim 1.

25. The method of claim 1, said method further comprising:
   a) in response to receipt of a configuration update request originating from a specific set-top box in the plurality of subscribing set-top boxes:
      i) accessing the database of subscribing set-top box profiles;
      ii) processing the database based on the configuration update request to identify a profile associated with the specific set-top box from which the configuration update request originated;
      iii) transmitting over a network a specific set of triggers to the specific set-top box from which the configuration update request originated, the transmitted specific set of triggers being associated with the identified profile.

26. The method defined in claim 1, said method comprising maintaining on a computer readable storage medium the database of subscribing set-top box profiles.

* * * * *